United States Patent
Mann, III et al.

(10) Patent No.: US 7,103,576 B2
(45) Date of Patent: Sep. 5, 2006

(54) SYSTEM FOR PROVIDING CARDLESS PAYMENT

(75) Inventors: William Frederick Mann, III, Avondale, PA (US); Jeffrey L. Hirka, Wilmington, DE (US)

(73) Assignee: First USA Bank, NA, Wilmington, DE (US)

( * ) Notice: Subject to any disclaimer, the term of this patent is extended or adjusted under 35 U.S.C. 154(b) by 811 days.

(21) Appl. No.: 09/956,997

(22) Filed: Sep. 21, 2001

(65) Prior Publication Data

US 2003/0061167 A1   Mar. 27, 2003

(51) Int. Cl.
G06F 17/60 (2006.01)
H04K 1/00 (2006.01)

(52) U.S. Cl. .............. 705/64; 705/65; 705/66; 705/67; 705/72; 380/28; 380/29; 380/30

(58) Field of Classification Search ............ 705/64–67, 705/72; 380/28–30
See application file for complete search history.

(56) References Cited

U.S. PATENT DOCUMENTS

| | | | |
|---|---|---|---|
| 3,896,266 A | 7/1975 | Waterbury | |
| 3,920,908 A | 11/1975 | Kraus | |
| 3,938,091 A | 2/1976 | Atalla et al. | |
| 4,123,747 A | 10/1978 | Lancto | |
| 4,321,672 A | 3/1982 | Braun et al. | |
| 4,386,266 A | 5/1983 | Chasarek | |
| 4,567,359 A | 1/1986 | Lockwood | |
| 4,582,985 A | 4/1986 | Löfberg | |
| 4,633,397 A | 12/1986 | Macco | |
| 4,672,377 A | 6/1987 | Murphy | |
| 4,695,880 A | 9/1987 | Johnson | |
| 4,696,491 A | 9/1987 | Stenger | |
| 4,700,055 A | 10/1987 | Kashkashian | |
| 4,707,592 A | 11/1987 | Ware | |
| 4,713,761 A | 12/1987 | Sharpe | |
| 4,725,719 A | 2/1988 | Oncken et al. | |
| 4,797,913 A | 1/1989 | Kaplan et al. | |
| 4,801,787 A * | 1/1989 | Suzuki | ....................... 235/380 |
| 4,823,264 A | 4/1989 | Deming | |
| 4,882,675 A | 11/1989 | Nichtberger | |

(Continued)

FOREIGN PATENT DOCUMENTS

DE      197 31 293      1/1999

(Continued)

OTHER PUBLICATIONS

EPO Search Report dated Sep. 23, 2004 EP 00 93 0499.

(Continued)

*Primary Examiner*—Kambiz Abdi
(74) *Attorney, Agent, or Firm*—Hunton & Williams

(57) ABSTRACT

The method and system of the invention provide a variety of techniques for using a selected alias and a selected personal identification entry (PIE) in conjunction with use of a transaction card, such as a credit card, debit card or stored value card, for example. A suitable number or other identification parameter is selected by the account-holder as an alias. The account-holder is then required to choose a PIE for security purposes. The alias is linked to the account-holder's credit card number via a database. When the account-holder enters into a transaction with a merchant, the physical card need not be present. The account-holder simply provides his or her alias and then the PIE. This can be done at any point of sale such as a store, catalog telephone order, or over the Internet. The alias and PIE are entered and authorization is returned from the credit card company.

41 Claims, 11 Drawing Sheets

U.S. PATENT DOCUMENTS

| | | |
|---|---|---|
| 4,964,043 A | 10/1990 | Galvin |
| 4,992,940 A | 2/1991 | Dworkin |
| 5,016,270 A | 5/1991 | Katz |
| 5,023,904 A | 6/1991 | Kaplan et al. |
| 5,050,207 A | 9/1991 | Hitchcock |
| 5,084,816 A | 1/1992 | Boese |
| 5,157,717 A | 10/1992 | Hitchcock |
| 5,180,901 A | 1/1993 | Hiramatsu |
| 5,181,238 A | 1/1993 | Medamana et al. |
| 5,198,975 A | 3/1993 | Baker et al. |
| 5,220,501 A | 6/1993 | Lawlor |
| 5,265,033 A | 11/1993 | Vajk |
| 5,287,403 A | 2/1994 | Atkins |
| 5,311,594 A | 5/1994 | Penzias |
| 5,317,683 A | 5/1994 | Hager |
| 5,321,841 A | 6/1994 | East |
| 5,336,870 A | 8/1994 | Hughes et al. |
| 5,351,186 A | 9/1994 | Bullock |
| 5,412,708 A | 5/1995 | Katz |
| 5,420,405 A | 5/1995 | Chasek |
| 5,420,926 A | 5/1995 | Low |
| 5,424,938 A | 6/1995 | Wagner et al. |
| 5,446,740 A | 8/1995 | Yien |
| 5,450,479 A | 9/1995 | Alesio et al. |
| 5,450,537 A | 9/1995 | Hirai |
| 5,465,290 A | 11/1995 | Hampton et al. |
| 5,467,269 A | 11/1995 | Flaten |
| 5,473,143 A | 12/1995 | Vak |
| 5,473,732 A | 12/1995 | Change |
| 5,475,740 A | 12/1995 | Biggs |
| 5,479,494 A | 12/1995 | Clitherow |
| 5,485,370 A | 1/1996 | Moss et al. |
| 5,487,107 A | 1/1996 | Atkins |
| 5,511,117 A | 4/1996 | Zazzera |
| 5,513,250 A | 4/1996 | McAllister |
| 5,532,920 A | 7/1996 | Hartrick |
| 5,534,855 A | 7/1996 | Shockley et al. |
| 5,537,314 A | 7/1996 | Kanter |
| 5,537,473 A | 7/1996 | Saward |
| 5,544,086 A | 8/1996 | Davis |
| 5,550,358 A | 8/1996 | Tait et al. |
| 5,557,518 A | 9/1996 | Rosen |
| 5,568,489 A | 10/1996 | Yien |
| 5,570,465 A | 10/1996 | Tsakanikas |
| 5,590,197 A | 12/1996 | Chen |
| 5,592,560 A | 1/1997 | Deaton |
| 5,594,837 A | 1/1997 | Noyes |
| 5,598,557 A | 1/1997 | Doner |
| 5,606,496 A | 2/1997 | D'Agostino |
| 5,613,012 A | 3/1997 | Hoffman |
| 5,621,789 A | 4/1997 | McCalmont |
| 5,621,812 A | 4/1997 | Deaton |
| 5,625,767 A | 4/1997 | Bartell |
| 5,627,355 A | 5/1997 | Rahman |
| 5,634,101 A | 5/1997 | Blau |
| 5,638,457 A | 6/1997 | Deaton |
| 5,644,493 A | 7/1997 | Motai |
| 5,652,786 A | 7/1997 | Rogers |
| 5,653,914 A | 8/1997 | Holmes et al. |
| 5,657,383 A | 8/1997 | Gerber |
| 5,659,165 A | 8/1997 | Jennings |
| 5,664,115 A | 9/1997 | Fraser |
| 5,675,607 A | 10/1997 | Alesio et al. |
| 5,675,662 A | 10/1997 | Deaton |
| 5,677,955 A | 10/1997 | Doggett |
| 5,684,870 A | 11/1997 | Maloney |
| 5,699,528 A | 12/1997 | Hogan |
| 5,706,442 A | 1/1998 | Anderson |
| 5,708,422 A | 1/1998 | Blonder et al. |
| 5,710,887 A | 1/1998 | Chelliah |
| 5,710,889 A | 1/1998 | Clark |
| 5,715,314 A | 2/1998 | Payne et al. |
| 5,715,399 A | 2/1998 | Bezos |
| 5,724,424 A | 3/1998 | Gifford |
| 5,727,163 A | 3/1998 | Bezos |
| 5,734,838 A | 3/1998 | Robinson |
| 5,737,421 A | 4/1998 | Audebert |
| 5,737,439 A | 4/1998 | Lapsley |
| 5,740,231 A | 4/1998 | Cohn |
| 5,742,035 A | 4/1998 | Kohut |
| 5,745,555 A | 4/1998 | Mark |
| 5,754,655 A | 5/1998 | Hughes |
| 5,754,840 A | 5/1998 | Rivette |
| 5,757,917 A | 5/1998 | Rose |
| 5,758,328 A | 5/1998 | Giovannoli |
| 5,761,647 A | 6/1998 | Boushy |
| 5,761,661 A | 6/1998 | Coussenns |
| 5,764,789 A * | 6/1998 | Pare et al. .................. 382/115 |
| 5,770,843 A | 6/1998 | Rose et al. |
| 5,774,122 A | 6/1998 | Kojima |
| 5,778,178 A | 7/1998 | Arunachalam |
| 5,779,367 A | 7/1998 | Obara |
| 5,784,562 A | 7/1998 | Diener |
| 5,787,154 A | 7/1998 | Hazra et al. |
| 5,790,650 A | 8/1998 | Dunn |
| 5,790,785 A | 8/1998 | Klug |
| 5,790,790 A | 8/1998 | Smith |
| 5,793,028 A | 8/1998 | Wagener |
| 5,793,861 A | 8/1998 | Haigh |
| 5,794,221 A | 8/1998 | Egendorf |
| 5,794,259 A | 8/1998 | Kikinis |
| 5,796,395 A | 8/1998 | De Hond |
| 5,802,176 A | 9/1998 | Audebert |
| 5,802,199 A | 9/1998 | Pare |
| 5,802,498 A | 9/1998 | Comesanas |
| 5,802,502 A | 9/1998 | Gell |
| 5,805,719 A | 9/1998 | Pare |
| 5,806,042 A | 9/1998 | Kelly et al. |
| 5,815,657 A | 9/1998 | Williams |
| 5,815,683 A | 9/1998 | Vogler |
| 5,819,092 A | 10/1998 | Ferguson |
| 5,819,285 A | 10/1998 | Damico |
| 5,822,737 A | 10/1998 | Ogram |
| 5,826,241 A | 10/1998 | Stein |
| 5,826,245 A | 10/1998 | Sandberg-Diment |
| 5,826,250 A | 10/1998 | Trefler |
| 5,828,812 A * | 10/1998 | Khan et al. .................... 706/2 |
| 5,832,476 A | 11/1998 | Tada |
| 5,835,580 A | 11/1998 | Fraser |
| 5,838,906 A | 11/1998 | Doyle |
| 5,842,178 A | 11/1998 | Giovannoli |
| 5,842,211 A | 11/1998 | Horadan |
| 5,844,553 A | 12/1998 | Hao |
| 5,845,259 A | 12/1998 | West |
| 5,845,260 A | 12/1998 | Nakano |
| 5,845,265 A | 12/1998 | Woolston |
| 5,847,709 A | 12/1998 | Card |
| 5,848,427 A | 12/1998 | Hyodo |
| 5,862,223 A | 1/1999 | Walker |
| 5,870,456 A | 2/1999 | Rogers |
| 5,870,473 A | 2/1999 | Boesch |
| 5,870,724 A | 2/1999 | Lawlor |
| 5,873,072 A | 2/1999 | Kight |
| 5,883,810 A | 3/1999 | Franklin |
| 5,884,032 A | 3/1999 | Bateman |
| 5,884,288 A | 3/1999 | Chang |
| 5,887,065 A | 3/1999 | Audebert |
| 5,889,863 A | 3/1999 | Weber |
| 5,892,900 A | 4/1999 | Ginter |
| 5,893,080 A | 4/1999 | McGurl |
| 5,897,621 A | 4/1999 | Boesch |
| 5,898,780 A | 4/1999 | Liu |
| 5,903,880 A | 5/1999 | Biffar |
| 5,903,881 A | 5/1999 | Schrader |

| Patent | Date | Name | | Patent | Date | Name |
|---|---|---|---|---|---|---|
| 5,914,472 A | 6/1999 | Foladare | | 6,144,948 A | 11/2000 | Walker |
| 5,915,023 A | 6/1999 | Bernstein | | 6,148,293 A | 11/2000 | King |
| 5,915,244 A | 6/1999 | Jack | | 6,154,879 A * | 11/2000 | Pare et al. ............. 705/35 |
| 5,918,214 A | 6/1999 | Perkowski | | 6,163,771 A | 12/2000 | Walker |
| 5,918,217 A | 6/1999 | Maggioncalda | | 6,170,011 B1 | 1/2001 | Macleod Beck |
| 5,918,239 A | 6/1999 | Allen | | 6,170,745 B1 | 1/2001 | Schiling |
| 5,926,812 A | 7/1999 | Hilsenrath | | D437,882 S | 2/2001 | Creighton |
| 5,930,767 A | 7/1999 | Reber | | 6,185,242 B1 | 2/2001 | Arthur |
| 5,933,816 A | 8/1999 | Zeanah | | 6,189,029 B1 | 2/2001 | Fuerst |
| 5,933,817 A | 8/1999 | Hucal | | 6,192,407 B1 | 2/2001 | Smith |
| 5,933,823 A | 8/1999 | Cullen | | 6,195,644 B1 | 2/2001 | Bowie |
| 5,933,827 A | 8/1999 | Cole | | 6,201,948 B1 | 3/2001 | Cook |
| 5,937,068 A | 8/1999 | Audebert | | 6,202,051 B1 | 3/2001 | Woolston |
| 5,937,396 A | 8/1999 | Konya | | 6,202,053 B1 | 3/2001 | Christiansen et al. |
| 5,940,812 A | 8/1999 | Tengel | | 6,202,151 B1 * | 3/2001 | Musgrave et al. ......... 713/186 |
| 5,952,641 A | 9/1999 | Korshun | | 6,205,433 B1 | 3/2001 | Boesch |
| 5,953,710 A | 9/1999 | Fleming | | 6,219,680 B1 | 4/2001 | Bernardo |
| 5,958,007 A | 9/1999 | Lee | | 6,223,168 B1 | 4/2001 | McGurl |
| 5,959,699 A | 9/1999 | Patel et al. | | 6,227,447 B1 | 5/2001 | Campisano |
| 5,960,411 A | 9/1999 | Hartman | | 6,230,148 B1 * | 5/2001 | Pare et al. ............. 705/40 |
| 5,963,647 A | 10/1999 | Downing | | 6,246,996 B1 | 6/2001 | Stein |
| 5,963,917 A | 10/1999 | Ogram | | 6,269,348 B1 * | 7/2001 | Pare et al. ............. 705/39 |
| 5,963,952 A | 10/1999 | Smith | | 6,295,522 B1 | 9/2001 | Boesch |
| 5,963,953 A | 10/1999 | Cram | | 6,308,268 B1 | 10/2001 | Audebert |
| 5,969,318 A | 10/1999 | Mackenthun | | 6,324,538 B1 | 11/2001 | Wesinger, Jr. et al. |
| 5,970,482 A | 10/1999 | Pham | | 6,341,724 B1 | 1/2002 | Campisano |
| 5,982,370 A | 11/1999 | Kamper | | 6,373,969 B1 | 4/2002 | Adler |
| 5,991,751 A | 11/1999 | Rivette | | 6,429,927 B1 | 8/2002 | Borza |
| 5,991,780 A | 11/1999 | Rivette | | 6,434,259 B1 | 8/2002 | Hamid et al. |
| 5,995,948 A | 11/1999 | Whitford et al. | | 6,446,049 B1 | 9/2002 | Janning |
| 5,999,907 A | 12/1999 | Donner | | 6,446,210 B1 | 9/2002 | Borza |
| 6,000,832 A | 12/1999 | Franklin | | 6,498,861 B1 | 12/2002 | Hamid et al. |
| 6,003,770 A | 12/1999 | Schiling | | 6,581,042 B1 | 6/2003 | Pare |
| 6,005,939 A | 12/1999 | Fortenberry | | 6,594,376 B1 | 7/2003 | Hoffman |
| 6,006,208 A | 12/1999 | Forst et al. | | 6,609,658 B1 | 8/2003 | Sehr |
| 6,012,088 A | 1/2000 | Li | | 6,662,166 B1 | 12/2003 | Pare |
| 6,014,636 A | 1/2000 | Reeder | | 6,685,088 B1 | 2/2004 | Royer |
| 6,014,638 A | 1/2000 | Burge | | 6,836,554 B1 | 12/2004 | Bolle |
| 6,018,714 A | 1/2000 | Risen | | 6,845,906 B1 | 1/2005 | Royer |
| 6,026,429 A | 2/2000 | Jones | | 6,879,966 B1 | 4/2005 | Lapsley |
| 6,029,150 A | 2/2000 | Kravitz | | 6,920,435 B1 | 7/2005 | Hoffman |
| 6,029,151 A | 2/2000 | Nikander | | 6,938,019 B1 | 8/2005 | Uzo |
| 6,029,890 A | 2/2000 | Austin | | 6,944,773 B1 | 9/2005 | Abrahams |
| 6,032,133 A | 2/2000 | Hilt | | 6,950,810 B1 | 9/2005 | Lapsley |
| 6,032,136 A | 2/2000 | Brake, Jr. et al. | | 6,957,770 B1 | 10/2005 | Robinson |
| 6,032,147 A | 2/2000 | Williams | | 6,980,670 B1 | 12/2005 | Hoffman |
| 6,042,006 A | 3/2000 | Van Tilburg et al. | | 2001/0054003 A1 | 12/2001 | Chien |
| 6,045,039 A * | 4/2000 | Stinson et al. ............. 235/379 | | 2002/0010599 A1 | 1/2002 | Levison |
| 6,049,835 A | 4/2000 | Gagnon | | 2002/0018585 A1* | 2/2002 | Kim ..................... 382/125 |
| 6,055,637 A | 4/2000 | Hudson | | 2004/0020982 A1 | 2/2004 | Hoffman et al. |
| 6,058,382 A | 5/2000 | Kasai | | 2004/0128249 A1 | 7/2004 | Hoffman |
| 6,061,665 A | 5/2000 | Bahreman | | | | |
| 6,064,987 A | 5/2000 | Walker | | | | |

FOREIGN PATENT DOCUMENTS

| | | |
|---|---|---|
| EP | 0 590 861 A2 | 6/1994 |
| EP | 0 855 659 | 7/1998 |
| EP | 0 884 877 | 12/1998 |
| EP | 0 917 119 | 5/1999 |
| EP | 1 017 030 | 7/2000 |
| EP | 1052603 A2 | 11/2000 |
| WO | WO 00/67177 | 11/2000 |
| WO | WO 01/35355 | 5/2001 |
| WO | WO 01/43084 | 6/2001 |

| 6,070,150 A | 5/2000 | Remington |
| 6,073,237 A | 6/2000 | Ellison |
| 6,081,810 A | 6/2000 | Rosenzweig |
| RE36,788 E | 7/2000 | Mansvelt |
| 6,085,176 A | 7/2000 | Woolston |
| 6,085,177 A | 7/2000 | Semple |
| 6,088,638 A | 7/2000 | Behrends et al. |
| 6,088,683 A | 7/2000 | Jalili |
| 6,088,700 A | 7/2000 | Larsen |
| 6,092,053 A | 7/2000 | Boesch |
| 6,098,052 A | 8/2000 | Kosiba et al. |
| 6,098,070 A | 8/2000 | Maxwell |
| 6,105,006 A | 8/2000 | Davis |
| 6,112,181 A | 8/2000 | Shear |
| 6,125,185 A | 9/2000 | Boesch |
| 6,128,598 A | 10/2000 | Walker et al. |
| 6,131,115 A | 10/2000 | Anderson |
| 6,131,810 A | 10/2000 | Weiss |
| 6,134,549 A | 10/2000 | Regnier |
| D434,041 S | 11/2000 | Burke |

OTHER PUBLICATIONS

EPO Search Report dated Sep. 22, 2004 EP 02 77 5858.
"Electronic Payment Systems for E-Commerce," D. O'Mahoney, M. Peirce, and H. Tewari, Second Edition, Artech House, Norwood, MA, 1997, pp. v-xii, 65-72, 112-114, and 159-160.
"Selling Online With . . . First Virtual Holdings, Inc.," P. Loshin, Copyright 1996, Charles River Media, Inc., Rockland, MA, pp. v-xiv, 32, 37-63, 65-94, 101-105, 108-115, 130-139, 151-188, 191-192, 193-211, 213-249, 254-260, 274-275, 303, 382.

AT&T News Release (Oct. 2, 1991) 6 pages.
US Banks and International Telecommunications (Oct. 1992) 16 pages.
Downtown Anywhere: The New Internet City (online commerce etc.) (Jul. 21, 1994) 3 pages.
Netbill 1994 Prototype (1994) 101 pages.
Interactive Media and Marketing (Dec. 1994) 2 pages.
The Globe ID Payment System (Spring 1994) 3 pages.
Microsoft, Visa to jointly develop PC electronic-shopping software, 1 page.
Appendices A-C Binary Code for Front End Program First Virtual Holdings, Inc. (1994) 251 pages.
Commercialization of the Internet (Nov. 1994) 9 pages.
Nick Rosen, Cash Just Isn't Flexible Enough (Feb. 10, 1995) 1 page.
Mihir Bellare et al., iKP—A Family of Secure Electronic Payment Protocols published at the First USENIX Workshop on Electronic Commerce (Jul. 1995) 14 pages.
Benjamin Cox et al., Netbill Security and Transaction Protocol published at the First USENIX Workshop on Electronic Commerce (Jul. 1995) 13 pages.
Virtual Money Electronic Tender (1995) 15 pages.
Lei Tang, A Set of Protocols for Micropayments in Distributed Systems published at the First USENIX Workshop on Electronic Commerce (Jul. 1995) 10 pages.
Jim Sterne, Putting the World Wide Web to Work (Apr. 1995) 32 pages.
Steve B. Cousins et al., Interpay: Managing Multiple Payment Mechanisms in Digital Libraries (Mar. 20, 1995) pp. 1-11.
Mark S. Manasse, The Millicent Protocols for Electronic Commerce published at the First USENIX Workshop on Electronic Commerce (Jul. 1995) 7 pages.
The Netbill Overview (May 15, 1995) 11 pages.
Wendy Bounds et al., Carnegie Mellon, Visa Plan to Offer Payment System for Data From Internet (Feb. 15, 1995) 1 page.
Jacqueline Day, Industry Players in Hot Pursuit of Secure Internet Transaction Mode (Jan. 1995) 2 pages.
Visa and Carnegie Mellow Plan Online Payment Scheme (Feb. 15, 1995) 1 page.
Gail Bronson, First Virtual's Pay Plan Gains Ground (Apr. 10, 1995) pp. 1-4.
The Downtown Anywhere Economy (1996) 1 page.
Citizenship in Downtown Anywhere (1996) 1 page.
Downtown Anywhere Glossary (1996) 2 pages.
Linda Jean Camp, Privacy and Reliability in Internet Commerce (Aug. 1996)pp. 1-145.
G. Tsudik, Zurich iKP Prototype (ZIP): Protocol Specification Document (Mar. 5, 1996) 31 pages.
Ronald L. Rivest et al., PayWord and MicroMint: Two Simple Micropayment Schemes (May 7, 1996) pp. 1-18.
Paiement Electronique: Enterprise Privee: CARI (Oct. 5, 1996) pp. 1-3.
CNET News.com, First Virtual Launches IPO (Dec. 13, 1996) pp. 1-3.
CNET News.com, E-commerce Firm Gets Bucks From Big Backers (Sep. 18, 1996) pp. 1-2.
Escrow, Inc—Tutorial, Signing up to be an i-Escrow User (1997) 22 pages.
Asia Matrix: Company Detail i-Escrow (1997) 1 page.
Escrow Colorado—Usage Questions: Using i-Escrow (1997) 7 pages.
Andrew Herbert, End-to-End Security Over the Internet: Deliverable D1-Implementation Architecture (Nov. 21, 1997) pp. 1-70.
CIO WebBusiness Magazine, i-Escrow, Inc.,—Overcoming Fear of Buying (Jul. 1998) 2 pages.
Jason Krause, Cybercash Indulges Impulse Buyers (Aug. 19, 1998) 2 pages.
The Report of the Consumer Electronic Payments Task Force (Apr. 1998) pp. 1-62.
EPOS: Europe-wide IC-card based Payment for Online Services, Project P705, vol. 2 of 4: Annex 1—State-of-the-art on payments for online service (Feb. 1998) pp. 1-78.
Ricarda Weber, Chablis-Market Analysis of Digital Payment Systems (Aug. 1998) pp. 1-122.
SmartCards: Enablers for Electronic Commerce (1998) pp. 1-15.
Sergio Da Silveira Malta, Electronic Commerce: The New Era of Commerce (Apr. 21, 1998) pp. 1-43.
Hector Garcia-Molina, Safeguarding and Charging for Information on the Internet (Feb. 1998) 8 pages.
Paul Nicholls, CyberCash First USA Offer One-Click Shopping (Oct. 16, 1998) pp. 1-4.
John Evan Frook, CyberCash Throws Out Old Wallet (Aug. 20, 1998) pp. 1-2.
Jackie Cohen, Auctions Away! i-Escrow Buys Rival (Jul. 16, 1999) pp. 1-2.
Reviews: iEcsrow, i-Escrow At A Glance Features Table (Jan. 12, 1999) pp. 1-2.
Credit Card News, First USA's Wallet Will Boost Its Online Presence (Mar. 15, 1999) pp. 1-3.
Steve Crocker, The Siren Song of Internet Micropayments (Apr. 22, 1999) pp. 1-7.
IAB Press Release, First USA Bank Named 1999 Marketer-of-the-Year (Jun. 9, 1999) pp. 1-2.
Community: About eBay: Releases 9905, eBay 1999 Press Releases (1999) pp. 1-10.
Kora McNaughton, CNET News.com, Old Law Limits Net Escrow Services (Mar. 15, 1999) pp. 1-2.
Issuers Make it Easier for Online Shoppers to Spend (Mar. 1, 1999) 2 pages.
Cardholder Information Security Program Version 5.5 (2000) pp. 1-42.
Mobile Commerce Report (2000) pp. 1-76.
Electronic Payment Systems Observatory Newsletter (Jul. 2000) pp. 1-76.
Amkela N. Malaba et al., User Perception of Micropayment Methods in Electronic Commerce (2001) pp. 1-22.
Virtual Organization Designs and Outsourcing of e-Commerce Systems (2001) 24 pages.
Introducing The Next Generation of Cash (2001) 4 pages.
Compaq Customer Success MobiPay First to Market with Mobile Payment Solutions (Oct. 2001) 8 pages.
About Us: Mission Statement (2001) 2 pages.
Paybox—send money with your mobile!, Company Overview: Paybox (Sep. 11, 2001) pp. 1-4.
Information Networking Insitute, NetBill: An Internet Commerce System Optimized for Network Delivered Services (2002) pp. 1-12.
Multos A Platform for Mobile Payments (Mar. 4, 2002) Slide 1—Slide 38.
AnyWay Mobile Payment Version 2.2 (Sep. 18, 2002) pp. 1-56.
David Buhan et al., Mobile Payments in M-Commerce (Feb. 2002) pp. 1-21.
Begin Escrow Transaction, NautiExchange: Begin Escrow Transactions (2003) pp. 1-2.
Wenbo Mao, On Two Proposals for On-line Bankcard Payments Using Open Networks (no date found) 9 pages.
Universal Card—Services & Benefits, AT&T Universal Card Member Benefits (no date found) pp. 1-4.
Electronic Payments: Private Company: CARI (no date found) 2 pages.
Escrow FAQs (no date found) 2 pages.
E-Commerce Business Center, What does i-Escrow do? (no date found) pp. 1-5.
E-Commerce Success Story: iEscrow.com (no date found) pp. 1-4.
Downtown Anywhere (no date found) pp. 1-4.
Become a Citizen, or Create or Revise a Registry Entry (no date found) 1 page.
Hilary Lane, BCBR Dec.: The Storeside (no date found) 1 page.
Instabuy—How It Works, Consumers FAQ (no date found) pp. 1-3.
Adam Flanagan, et al., First Virtual Holdings Incorporated (no date found) 17 pages.
AT&T Universal Card Services (1993), 5 pages.
Electronic Payment Systems (no date found) pp. 1-41.
Steven P. Ketchpel et al., U-PAI: A Universal Payment Application Interface (no date found) 17 pages.
Sid L. Huff, et al., First Virtual Holdings Incorporated (no date found) pp. 624-628.

Wolfgang Röckelein, Systems for Purchases on the Internet: Requirements and Evaluation (no date found) 27 pages.

Project 74: Text Report (no date found) 62 pages.

Andreas Crede, et al., Electronic Commerce and the Banking Industry: The Requirement and Opportunities for New Payment Systems Using the Internet (no date found) pp. 1-18.

Netbill Design (no date found) pp. 11-90.

Pete Loshin, Selling Online With . . . First Virtual Holdings, Inc. (1996).

Electronic Payment Systems for E-Commerce Second Edition (2001) (No Copy).

Jois Claessens et al., Anonymity controlled electronic payment systems, 8 pages.

ECharge, Dec. 3, 1999, 12 pages.

eCharge, eCharge Corporation, www.echarge.com, Dec. 3, 1999.

Tracy Pletz et al., Summary of the at your risk architechture, Jun. 3, 1999.

Siebel, Siebel: Ensuring Customer Success, www.siebel.com, Nov. 17, 1999.

OMG, Welcome to OMG's CORBA for Beginners Page!, www.omg.com, May 25, 1999.

Sun MicroSystems, Inc., Schema for Representing CORBA Objects in an LDAP directory, May 21, 1999.

OMG, Library, www.omg.com, May 25, 1999.

OMG, What is CORBA?, , www.omg.com, May 25, 1999.

Overview of CORBA, , www.omg.com, May 25, 1999.

JAVA, JAVA™ Technology in the Real World, java.sun.com, May 21, 1999.

JAVA, JAVA™ Servlet API, java.sun.com, May 21, 1999.

JAVA, Staying in Touch with JNDI, java.sun.com, May 21, 1999.

JAVA, JAVA™ Remote Method Invocation (RMI) Interface, java.sun.com, May 21, 1999.

JAVA, Banking on JAVA™ Technology, java.sun.com, May 21, 1999.

JAVA, The JDBC™ Data Access API, java.sun.com, May 21, 1999.

Anne Thomas, Enterprise JAVABEANS™ Technology: Server Component Model for the Java™ platform, java.sun.com, May 21, 1999.

S. R. Hiremath, Numerical Credit Scoring Model, Operations Research Bulletin, WA13.16, Apr. 30, 1975.

Reuters, Getting Smart with Java: Sun Micro Says American Express to Use Java for Smart Card, www.abcnew.go.com/sciences/tech, Jun. 6, 2000.

David Bank, Cash, Check, Charge—What's Next?, Seattle Times, Mar. 6, 1998.

Gerry Vandenengel, Cardson the Internet: Advertising on a $3 Bill, Industry Intelligence, Feb. 1, 1995.

Kim A. Strassel, Dutch Software Concern Experiments with Electronic 'Cash' in Cyberspace, Wall Street Journal, Apr. 17, 1995.

Jeffrey Kutler, Cash Card Creator Looking Beyond Mondex, Feb. 9, 1995.

David Post, E-Cash: Can't Live With It, Can't Live Without It, The American Lawyer, pp. 116-117, Mar. 1, 1996.

Russel Mitchell, Cyberspace: Crafting Software . . . , Business Week, pp. 78-86, Feb. 27, 1995.

Jeffrey Kutler, A Different Drummer on the Data Highway, American Banker, May 12, 1995.

Stephen Eppmt, A pLayer Goes After Big Bucks in Cyberspace, American Banker, May 5, 1995.

Robert Bamham, Network Brings Together Producers and Companies, Bests Review Feb. 1, 1994.

Vanessa Houlder, OFT Gives the Individual Top Priority: Report Calls for Deregulation of Business Lending, The Financial Times, Jun. 8, 1994.

Kennedy Maiz, Fannie Mae on the Web, Newsbyte, May 8, 1995.

Anne Knowles, Improved Internet Security Enabling On-Line Commerce, PC Week, Mar. 20, 1995.

Aversion Therapy: Banks Overcoming Fear of the Net to Develop Safe Internet-based Payment System w/ Netscape Communicator, Network World, Dec. 12, 1994.

Don Clark, Microsoft, Visa to Jointly Develop PC Electronic-Shopping Software, Wall Street Journal, The, B9, Nov. 9, 1994.

Understanding Product Data Management, Hewlett-Packard Company, Apr. 26, 1999.

Getting Started: Specific GE TPN Post Service Use Guidlines, GE, Apr. 26, 1999.

Resource Center: Consolidated Edison Selects GE TPN Post, GE, Apr. 26, 1999.

ThomasNet, Thomas Publishing Company, Apr. 26, 1999.

SoluSource: For Engineers By Engineers, Thomas Publishing Company, Apr. 26, 1999.

Harris InfoSource, Apr. 26, 1999.

Welcome to Muse, Muse Technologies, Apr. 26, 1999.

Product Data Integration Technologies, Inc., PDIT, Apr. 26, 1999.

SBA: Pro-Net, SBA, Apr. 1, 1999.

FreeMarkets, FreeMarkets Online, Inc., Apr. 26, 1999.

Associates National Bank (DE) Credit Card Services, The Associates, www.theassocitheassociates.atescomcom/consumer/credit_cards/main.html, Apr. 6, 1999.

At Your Request, Wingspanbankcom, Sep. 28, 1999.

Robyn Meredith, Internet bank moves closer to virtual reality, USA Today, May 5, 1995.

Marvin Sirbu and J.D. Tygar, NetBill: An Internet Commerce System Optimized for Network Delivered Services, http://www.ini.cmu.edu :80/netbill, pp. 1-12, Feb. 27, 1995.

The check is in the email., Information Today, vol. 12, No. 3, Mar. 1, 1995, ISSN: 8755-6286.

The Gale Group, G&D America's Multi-application Smart Card Selected for Combined Payroll and 'Virtual Banking' Program in Mexico, wysiwyg://0/http://www.dialogclassic.com/history, Business Wire, Apr. 24, 1998, p. 4241047.

Richard Mitchell, Netlink Goes After An Unbanked Niche, wysiwyg://0/http://www.dialogclassic.com/history, ISSN: 1093-1279, Sep. 1999.

International Search Report PCT/US00/12633 MAILED Aug. 1, 2000.

<www.echarge.com>, 1999 eCharge Corporation, Seattle, WA (Info@eCharge.com); publication date unknown, website last updated on Nov. 18, 1999.

\* cited by examiner

SYSTEM FOR PROVIDING CARDLESS PAYMENT

SYSTEM FOR PROVIDING CARDLESS PAYMENT

This application is related to U.S. patent application Ser. No. 09/957,505, entitled "Method For Providing Cardless Payment" which is incorporated herein by reference in its entirety.

FIELD OF THE INVENTION

The system of the invention relates generally to performing transactions related to an account, so as to eliminate the need for the physical presence of a transaction card during the transaction.

BACKGROUND OF THE INVENTION

There are literally thousands of different credit cards, funds cards or other personal cards available which provide an account-holder with a variety of capabilities. Some provide frequent flier miles, others give a user free gas. Still other credit cards offer low interest rates and even insurance for purchases. Out of all the transaction cards that exist, none of them offer the ability to go to a store and make purchases, without the actual card, by utilizing convenient identifying information that is selected by the account-holder.

Further, conventional known techniques do not provide for conducting business over the Internet without using the transaction card number, for example, or some other mandated number. That is, the conventional techniques do not provide for an account-holder to select convenient identifying information by which to access and use that account-holder's account.

To explain, it is highly desirable to use easy to remember numbers or other information to effect transactions. Illustratively, while it is possible to place an order over the phone to a catalog company, it is burdensome to have a physical card in your hand to read the card number to the sales person and provide some additional information such as the expiration date. Perhaps a trivial number of people have memorized their transaction card number and expiration date, but most people have yet to commit these seldom used 20-digits, for example, to memory, i.e., the 20-digit number including a 16 digit card number and a four digit expiration date.

Additionally, those with an active lifestyle often find it burdensome to carry many cards with them during their everyday lives. The risk of losing one's wallet or purse, or having it stolen is an ongoing problem. The replacement process for most credit cards, a particular type of transaction card, for example, is long and burdensome. If a credit card is stolen and unauthorized charges are discovered on the account, the process to rectify the situation is both time consuming and exhausting, often involving sworn affidavits by the cardholder.

These drawbacks, as well as others, exist with current transaction cards and the techniques utilized in conjunction with such current transaction cards.

SUMMARY OF THE INVENTION

The disclosed method and system in accordance with embodiments of the invention provide a technique for allowing an account-holder to select an alias by which an account-holder may access and use a transaction account using convenient and/or easy to remember information. Further, the method and system in accordance with embodiments of the invention provide a technique for allowing an account-holder to select an alias, as well as a personal identification entry, by which an account-holder may access and use a transaction account using convenient and/or easy to remember information.

The present invention further provides a system and method for enabling an account-holder to use his or her transaction card or a transaction account without actually having a card present at the time of purchase. This is accomplished by cross-linking the account-holder's phone number, or other alias that is selected by the account-holder, to the transaction card number, such as a credit card number, and providing the customer with a corresponding "personal identification entry" (PIE) that can be changed immediately upon receipt so that it is a number that the account-holder can easily remember. It should be appreciated that a PIE may take the form of a conventional Personal Identification Number (PIN). The PIE can also be selected by the account-holder from his or her home phone. As one method of authentication, the bank can verify the identity of the caller by their phone number, if their phone number is chosen as the PIE, using an Automatic Number Identification ("ANI") system, which ensures a secure registration of the PIE. The customer can then selfselect the PIE he or she wishes to use.

These and other aspects and advantages of the invention will be apparent from the detailed description of the exemplary embodiments which follow.

DETAILED DESCRIPTION OF THE PREFERRED EMBODIMENTS

Hereinafter, various embodiments of the method and system of the invention will be described. As used herein, a "transaction card" means a credit card, debit card, stored value card, smart card, or any other type of card, electronic account, or payment vehicle that is used by a person or an entity and that allows that person or entity to perform any of a wide variety of transactions, which relate to an account, i.e., a "transaction account," including electronically accessing funds, mutual funds, money market accounts, margin accounts, bank accounts, sweeps card accounts, a line of credit, stock information, electronically accessing information such as address information, or performing other transactions, for example.

Further, the transaction card may be used by any of a variety of users characterized herein as "account-holders." Accordingly, an "account-holder" may be any of a variety of persons or users having an account or accounts including, for example, a cardholder, i.e., a person who possesses a card of some type, but who does not need to physically carry the card with them as a result of the systems and methods of the invention.

Figure 1:
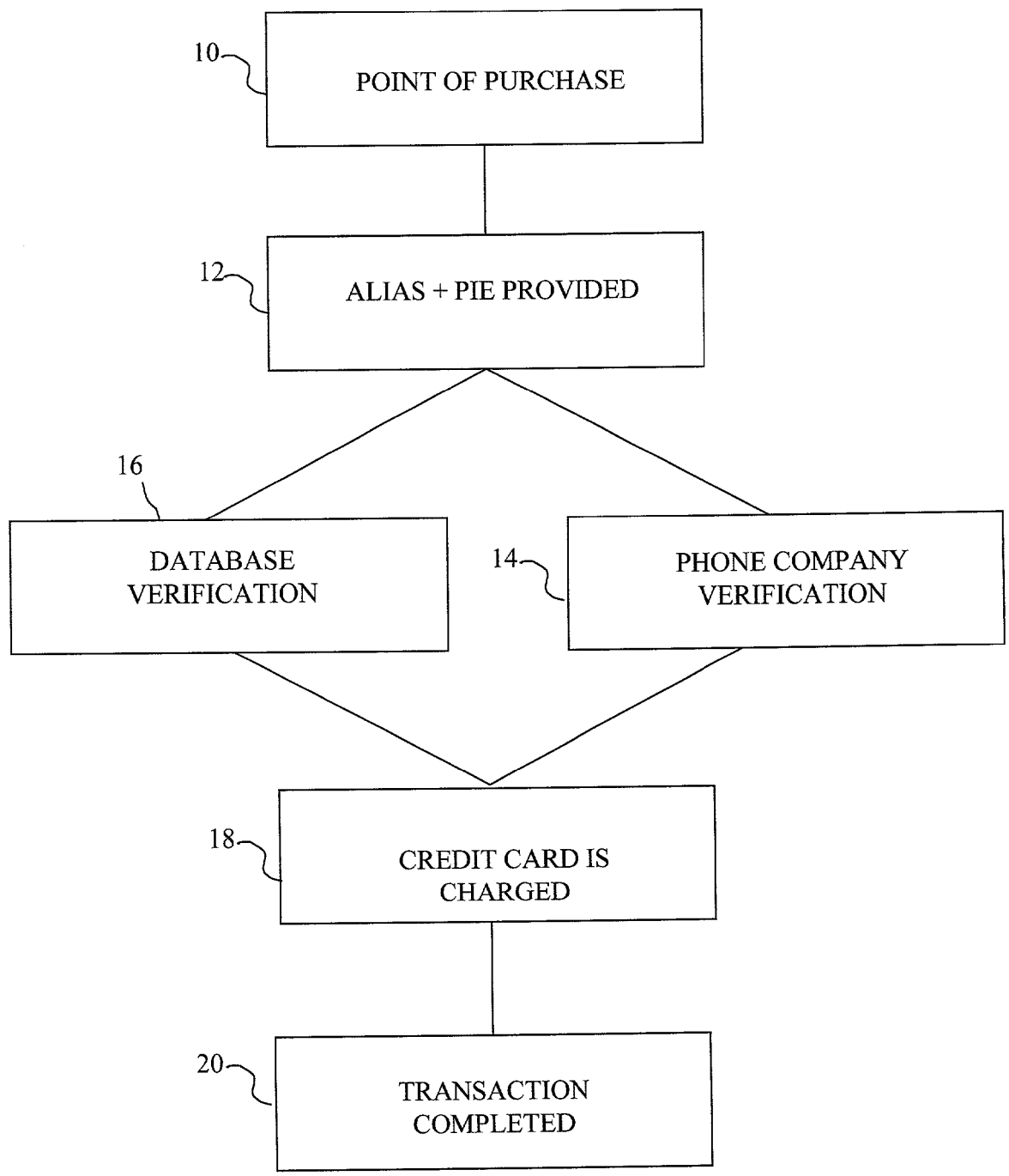
FIG. 1 is a flow chart showing a method of use according to one embodiment of the invention.

FIG. 1 shows one example of an account-holder transaction according to the method of the present invention. In FIG. 1, a credit card purchase is commenced at any given "point of purchase" location in step 10. A "point of purchase location" is any location where it is possible to make a purchase using a credit card. For example, any store that accepts credit cards would be a point of purchase location. Any telephone can be considered a point of purchase location since it is possible to telephone a company, such as a catalog company, and place a credit card order over the phone. Instead of providing the merchant with the credit card for payment, or in the case of a telephone order providing the card number and expiration date, the account-holder will enter a selected alias, such as the account-holder's ten-digit home telephone number, or alternatively a cellular number or personal communications service (PCS) number, for example, and the selected PIE, such as a home telephone number, into a device similar to the credit card readers in use today in step 12.

This device will connect to a database, perhaps the database already maintained by the telephone company in step 14, and it will check for authenticity. Alternatively, the transaction card company may have their own database which includes all the appropriate information and can verify the account-holder and process the transaction with the appropriate card in step 16.

The validation process should be fairly quick and will then retrieve the credit card linked to the alias and PIE the account-holder has provided. After validation has succeeded, the credit card will be charged and the merchant will receive notice of this validation in step 18. The account-holder must then sign some sort of receipt or authorization slip and the transaction is complete in step 20.

This entire process is very similar to current day credit card transactions with the exception that instead of providing a plastic card, the account-holder need only enter their selected alias number and selected PIE. In accordance with this embodiment of the method of the invention, a suitable "keypad" is used by customers so they can enter their alias and/or their PIE. Optimally, the arrangement of the keypad allows the customer to enter the required information discreetly. Alternatively, the customer can provide the alias and PIE directly to the merchant either verbally or in writing, for example.

Figure 2:
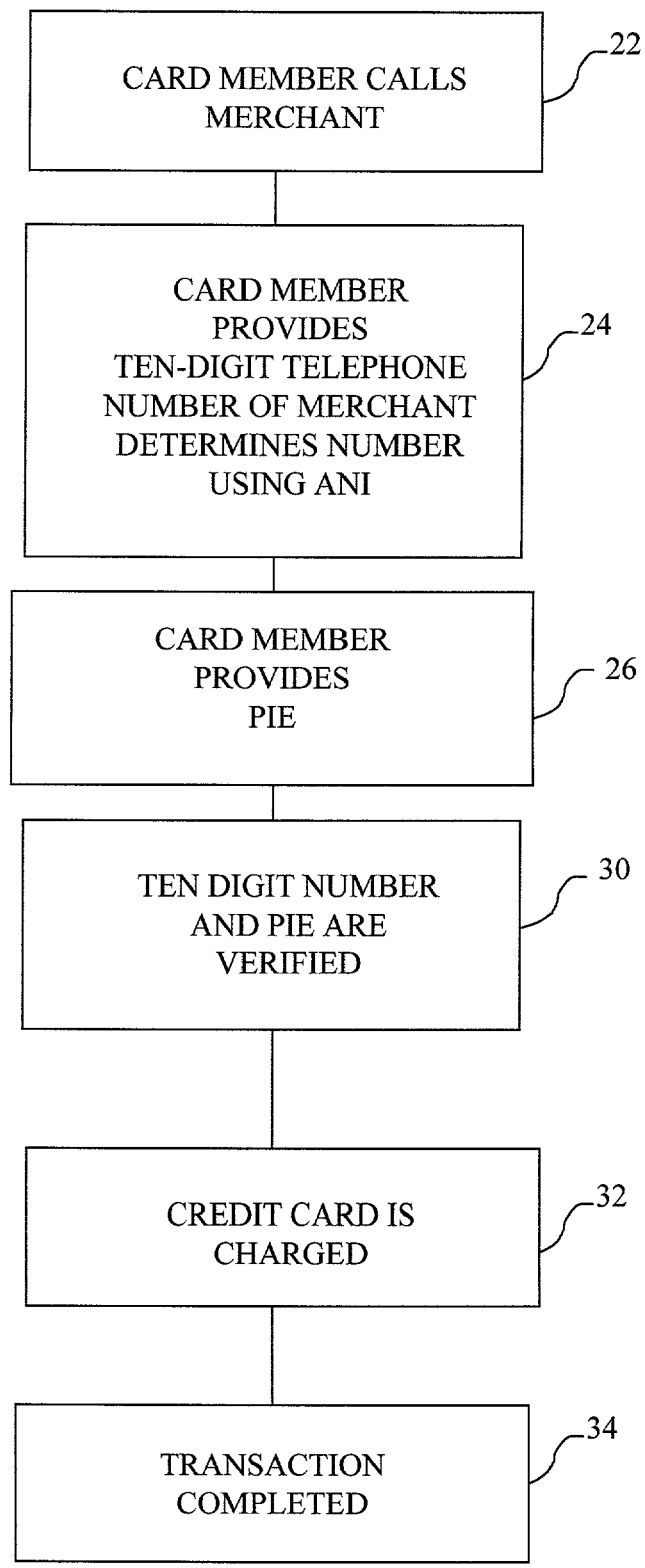
FIG. 2 is a flow chart showing a transaction according to one embodiment of the invention.

FIG. 2 shows a similar transaction between an account-holder and a merchant conducted over a telephone, or alternatively cellular phone or personal communications service (PCS), for example. In FIG. 2, an account-holder initiates a transaction by calling a merchant over the telephone in step 22. After identifying the item to be purchased, the account-holder authorizes his card to be charged by providing the representative with his alias, which in this case is his ten-digit telephone number. Alternatively, the merchant may use an ANI to determine the telephone number of the caller in step 24, i.e., if the caller has designated their home phone number as the alias. This is useful in situations where the account-holder is calling from their home and provides an added measure of security to make sure the authorized account-holder is the one placing the order.

The transaction is continued and the card number received by the merchant is verified using the account-holder's PIE. In step 26, the account-holder provides the PIE to the merchant. This can be done by having the account-holder punch in the PIE on the telephone key pad or verbally indicating the PIE to the merchant, for example. The ten-digit number, i.e., the alias, and PIE are verified by the merchant in step 30. The verification process is similar to that used to verify original credit card numbers and expiration dates. Once the number has been verified, the merchant processes the transaction and the credit card is charged in step 32. After the credit card has been charged, the transaction is completed in step 34.

Figure 3:
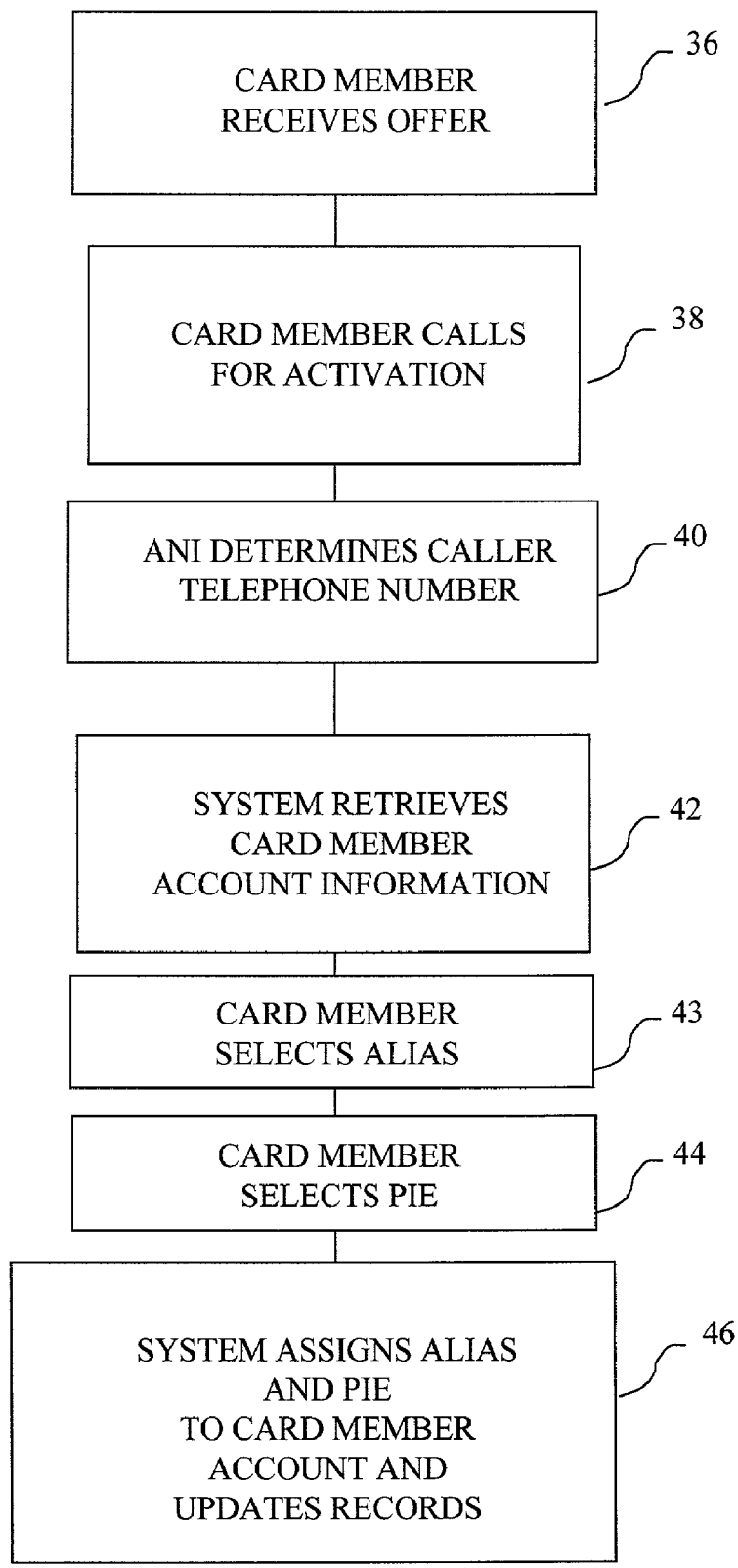
FIG. 3 is a flow chart showing acceptance of an offer and set up of an account according to one embodiment of the invention.

It should be appreciated that selecting an alias and selecting a PIE are relatively easy processes in accordance with embodiments of the method of the invention. FIG. 3 shows the activation and assignment process for a current account-holder. A current account-holder, in this case a card member, is a person that already has a credit card account with the credit card company and is merely calling to select their alias, as well as selecting a PIE. The process is initiated in step 36 when a current account-holder receives the offer from the credit card company to select an alias. This offer can be received by mail, e-mail, telephone, or any number of ways. If the offer was received by any manner other than a telephone call, the account-holder calls the credit card company for activation in step 38 in accordance with one embodiment of the method of the invention. When the call is received by the credit card company, the caller's telephone number is automatically identified by an ANI system in step 40.

By determining the telephone number of the caller, the credit card company can determine the caller's identity and account number. This can be done by asking the caller for his account number or, preferably, by having a system, such as a voice recognition unit (VRU), obtain the account number from the caller and automatically retrieve the account-holder's account information based on the telephone number as shown in step 42. In step 43, the card member selects an alias. Then, the process passes to step 44.

In step 44, the account-holder selects a PIE to be used with his telephone number alias. Alternatively, the credit card company can assign a PIE, as well as multiple PIEs or multiple aliases, randomly. The activation process is completed in step 46 when a credit card company assigns an alias and a PIE to the account-holder's account and updates the appropriate database record or records. This updating may of course be done automatically.

In accordance with further embodiments of the method of the invention, the activation process performed over the telephone can be totally automated as well. For example, a current account-holder would receive the offer in the mail including a telephone number for the account-holder to call for activation. The account-holder would then call the designated number. The credit card company could then automatically determine the account-holder's telephone number using an ANI and present the account-holder with a pre-recorded menu of options, such as by utilizing a voice recognition unit or system. By using these options the account-holder would be able to request selection of the alias and select a PIE using the telephone key pad. Registration is then completed by having the system automatically update the account-holder's account and records with the selected alias and the selected PIE.

Figure 4:
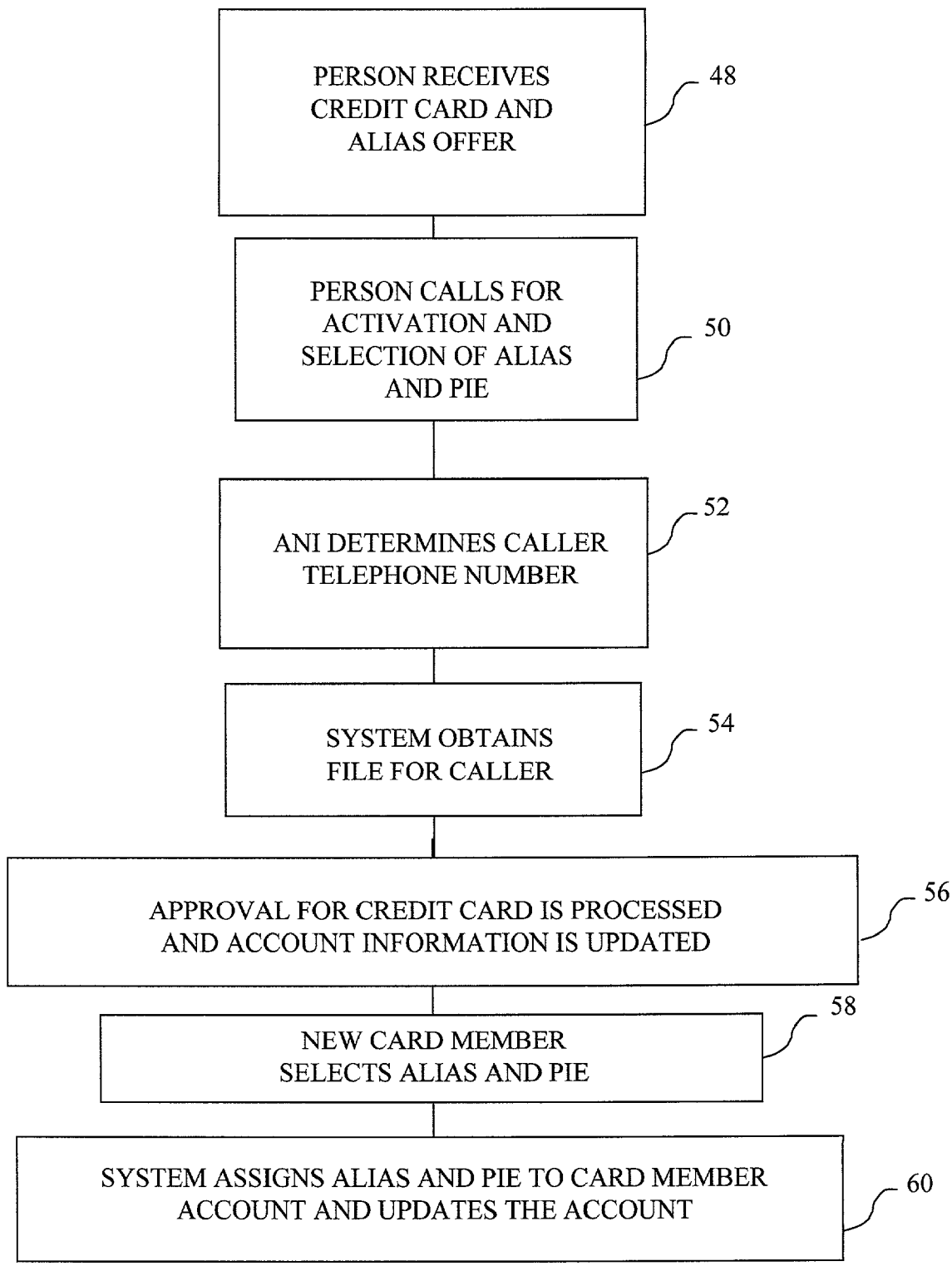
FIG. 4 is a flow chart showing acceptance of an offer and set up of an account according to one embodiment of the present invention.

The activation and registration process can also be utilized by a new account-holder. As shown in FIG. 4, a new member would receive a credit card offer with an option to select an alias for the new account in step 48. The person can accept this offer and apply for the credit card and alias by calling a designated number for activation in step 50. In step 52, the credit card company can use an ANI to determine the caller's telephone number for verification. Alternatively, a customer service representative can verbally obtain the information from the account-holder. In step 54, the system would receive a file containing the caller's financial information and pre-approval status. This information can be used by a customer service representative, or by the system automatically, to activate a new account for the caller. Preferably, a customer service representative would obtain additional financial information and confirm existing information thus providing the credit card company with a more thorough screening process.

Approval for the new account can then be processed in step 56 and any updating can also be performed as well. At this time, the account-holder can select an alias and a PIE as shown in step 58. The registration and activation process is completed in step 60 when the system assigns the alias and the PIE to the account-holder's account and updates the account accordingly. At this point, the system can activate the account or hold it pending approval of subsequent credit checks as may be desired.

Consumers who have a plurality of transaction cards have the option of selecting multiple PIEs, each of which would correspond to a different transaction card, but be used with the same alias, in accordance with some embodiments of the invention. When making a purchase, the account-holder need only provide the selected alias and the PIE corresponding to the card he or she wishes to charge the purchase on.

Security measures for the cardless payment system, in accordance with embodiments of the method of the invention, will be nearly the same as those used by credit cards. Credit cards themselves are not a secure system by definition. If a card is lost or stolen, misuse of the credit card is quite possible. The same systems used to handle fraud for credit cards may be used to handle the present invention. No new security issues exist with the cardless payment system, in accordance with embodiments of the method of the invention, beyond the current ones faced by credit cards today. In fact, perhaps even less security issues exist with the cardless payment system of the invention due to the fact that no transaction card is being carried around by the account-holder and thus the chances of having the transaction card lost or stolen is significantly reduced. If the account-holder decides to destroy the plastic card and rely solely on the cardless payment system of the invention, providing the capability to select an alias and a PIE, then the chances of the card being lost or stolen are practically zero.

The registration process for the cardless payment system, in accordance with embodiments of the method of the invention, is also unique. By allowing an account-holder to choose the account-holder's alias and PIE, the systems and methods of the invention provide convenience and ease-of-mind to the account-holder. That is, the account-holder may choose both an alias and a personal identification entry (PIE) that is easiest for him or her to remember, or alternatively, that is more closely tailored to the particular's account-holder's needs. For example, an account-holder may desire additional security than is normal. As a result, the account-holder might not use her home phone number as the alias, but rather some more obscure number.

Additionally, in accordance with further embodiments of the invention, once consumers have entered their alias, they can select multiple payment methods. For example, if an account-holder has two different credit cards and a debit card, with the same or multiple issuers, after entering their ten-digit alias number and PIE they can choose which card to use for payment through some sort of self-selection menu. Alternatively, a single account-holder may have multiple PIEs representing different credit cards. In accordance with embodiments of the method of the invention, it is possible to assign one PIE to their Visa card and another PIE to their MasterCard, both on the same alias, i.e., the same phone number, for example.

It should be appreciated that uses of the method of the invention include, but are not limited to, any "point of sale" where there is a suitable terminal at which point consumers can enter in a number. The invention is also applicable to card not present situations including ordering a product by telephone or over the Internet, for example. The systems and methods of the invention allow the consumer to buy something without giving their credit card information over the phone. That is, if the consumer's home phone number is selected as the alias, all that the consumer needs to do is enter the PIE, since the phone number is automatically detected over the phone by the merchant. This is added security since many people still do not like disclosing credit card numbers over the phone.

As described above, communication over the telephone may be utilized to select an account-holder's alias, as well as to select a PIE. However, it should be appreciated that the system and method of the invention is not limited to the telephone. An offer to select an alias may be e-mailed from the credit card company to the account-holder or performed using a suitable web page or other world wide web technology, for example. If using e-mail, once the e-mail is received, the account-holder may then select the alias over the Internet via e-mail, as well as select a PIE. It should also be appreciated that other suitable forms of communication over the Internet, or other network, may also be utilized in implementation of the method of the invention other than e-mail.

As a further alternative to selection of the alias and selection of a PIE over the telephone, the account-holder might physically go to an office of the transaction card company, for example. At the transaction card company office, the alias could be selected and the PIE selected through human interaction. In accordance with further embodiments of the method of the invention, an account-holder might utilize an automated machine for selection of the alias and selection of a PIE, or alternatively to change the alias or PIE. Such automated machines may be strategically geographically positioned in a manner similar to automated teller machines (ATM). Further, the processing and communications capabilities required to perform alias selection and PIE selection, as well as use, may be combined with the technology utilized in conventional ATMs, i.e., combined within the same physical machine.

Further, it should be appreciated that selection of an alias and a personal identification entry may not involve simply the selection of alphanumerics. That is, an account-holder may choose to select an alternative type of alias or personal identification entry. For example, such alternative types may include fingerprint recognition, gene identification, DNA identification, use of biometrics, i.e., using biological parameters of a person, retina identification, or voice recognition, for example.

As described above, an account-holder selects a PIE that is used in conjunction with the alias for a particular transaction card, for example. However, in accordance with further embodiments of the system and method of the invention, one alias may be used with multiple PIEs for one transaction card. To explain, an account-holder might rotate through three different PIEs. That is, the account-holder would make a first purchase in the morning using her first PIE. Thereafter, the account-holder might make two additional purchases in the afternoon using her second and third PIE, respectively. Then, in the evening when making a fourth purchase of the day, the account-holder would again use her first PIE. Using this method, the account-holder must keep track of which PIE the account-holder is currently on, i.e., what PIE in the rotation the account-holder should use next. It should of course be appreciated that any number of PIEs might be utilized in the rotation.

As the number of PIEs increases, the complexity of keeping track of which PIE to use will of course increase. Accordingly, it should be appreciated that the complexity of the transaction may be justified based on the desired level of security. In contrast, the complexity of keeping track of which PIE to use may not be justified by the required level of security, thus resulting in the potential for unnecessary confusion to the account-holder.

As described above, when using multiple PIEs, the account-holder must keep track of which PIE the account-holder is currently on. This may be problematic since, for example, long periods of time may pass between uses of a particular card. To provide assistance to the account-holder in remembering their current place in the PIE rotation, a prompt may be provided to the account-holder during a transaction. For example, the prompt may be displayed subsequent to the account-holder entering their alias. The prompt might be in the form of "Currently on PIE rotation 2." The account-holder would then remember the PIE that corresponds with that particular rotation number. Alternatively, the prompt might say "currently on PIE 2," so as to provide the useful feedback to the account-holder.

Other feedback might also be provided in accordance with embodiments of the method of the invention. As described above, a single account-holder may have multiple PIEs representing different credit cards, from the same or different issuers. That is, it is possible to assign one PIE to their VISA card and another PIE to their MasterCard, both on the same alias. Subsequent to performing a transaction using the account-holder's alias and a particular PIE, feedback may be provided to the account-holder indicating which account was debited, for example. For example, the feedback may be in the form of "VISA debited using PIE '8049," wherein 8049 is the last four digits of the account-holder's PIE number. It should of course be appreciated that other useful feedback information may be provided as is necessary or desired. This information may be printed on an account-holder's receipt, for example, or otherwise conveyed to the account-holder. The information might be in the form of a short text message. Accordingly, the account-holder would be advised of the authentication and verification of the transaction, and the source from which the funds were debited, for example.

The use of the above PIE rotation process provides an additional level of security to the account-holder. For example, another customer behind the account-holder might note the PIE number entered by the account-holder into a keypad at a grocery store. Further, the additional customer might have heard, or be able to otherwise obtain the alias used by the account-holder, in particular if the alias is the account-holder's telephone number. However, when the additional customer attempts to use this information to perform a fraudulent transaction, the additional customer's chances of success will be substantially limited, depending on where the account-holder is in the PIE rotation.

In various embodiments described above, the system and method of the invention are utilized in the context of using a credit card. However, it should be appreciated that the invention is not limited to use with a credit card. Any of a variety of other transaction cards might also benefit from use of the alias and PIE described herein. Accordingly, stored value cards or debit cards, for example, might be used in conjunction with the methods of the invention.

In accordance with some embodiments of the method of the invention, it should be appreciated that multiple PIEs might be used to control from which card requested funds are obtained. To explain, an account-holder might possess a credit card, a debit card and a stored value card. Further, that account-holder may always prefer to use his credit card, but of course only if there is available credit thereon. Accordingly, the particular PIE utilized by the account-holder may control the hierarchical ranking of which card is accessed first, second, third, and so forth. In other words, one of a plurality of possible PIEs, which is entered by the account-holder, may determine the hierarchical ranking of which of the plurality of possible funds accounts is accessed for withdrawal of funds.

For example, a PIE "BG123" might access the credit card, debit card, and stored value card in order, obtaining the requested funds from the first card that is able to grant the request. A different PIE may be utilized to change the hierarchical order. That is, the PIE "BG231" might be used for the hierarchical order of looking first to the debit card, then to the credit card, and lastly, to the stored value card in order to obtain requested funds.

As described above, the alias and PIE may utilize numbers, such as for example a telephone number. However, the method of the invention is not limited to use of numbers. That is, any of numbers, alphanumerics, names, phrases, or combinations of numbers, alphanumerics, names or phrases, for example, might be utilized for either the alias or the PIE. Also, alternative techniques of identification might be utilized for either the alias or the PIE, such as human characteristics. These further forms of identification might include fingerprint recognition, gene identification, DNA identification, use of biometrics, i.e., using biological parameters of a person, retina identification, or voice recognition, for example.

As described above, the person's phone number, for example, might be used as a PIE. Illustratively, if a transaction is done over the telephone, the caller's phone number might be determined using an ANI system. This allows the caller's PIE to be immediately obtained and stored. Once the caller provides his alias, and the association is made with the corresponding account of the caller using the alias, the PIE may then be retrieved from memory for authentication or authorization of the desired transaction.

In accordance with further embodiments of the method of the invention, a person's signature might also be utilized as either the alias or the PIE. To further explain in the context of utilizing a signature as a PIE, a customer would initially be prompted to enter their alias, for example, their telephone number. Thereafter, the customer would be prompted to sign their name utilizing a digital signature pad. That is, the digital signature pad captures the signature digitally and stores the signature information in what might be characterized as a "new signature data file." The information in the new signature data file is then compared with an authorized signature, which is maintained at a central processing center of the bank or other entity, for example. That is, the new signature data file is compared with an authorized signature data file to determine the level of similarities. The comparison may be performed by comparing the data points of the new signature, i.e., an executed signature, with the data points of the authorized signature. That is, the new signature might be mapped on to the authorized signature. If the similarity of the new signature and the authorized signature achieves a predetermined threshold, then the new signature is approved. It should be appreciated that the predetermined threshold may be determined based on a variety of parameters including weighing concern over potential fraudulent transactions against chronic problems of an authorized customer's signature not being accepted.

As described above, an account-holder uses an alias and a PIE, or alternatively, multiple PIEs. In accordance with one embodiment of the method of the invention, the account-holder routinely changes, i.e., updates, his or her PIE. This updating of the PIE might be performed using the telephone, over the Internet, through a sales representative at an office, by mail, or using an automated machine located at a convenient location, for example.

In accordance with this embodiment, a user selects an initial alias and PIE during activation. Also at activation, the account-holder selects the option of routinely changing her PIE number. As a result, after five transactions, for example, using the alias and first PIE, such first PIE then becomes invalid. As a result, the account-holder must contact the credit card company or other entity in order to obtain a new, i.e., a refreshed, PIE. Once this new PIE is obtained by the account-holder, then the account-holder uses this second PIE for the next five transactions. Thereafter, the second PIE becomes invalid. Such periodic changing of the PIE based on the number of transactions provides an added level of security, which may be preferred to some account-holders, balanced against the inconvenience of renewing the PIE. It should be appreciated that rather than every five transactions, any suitable number of transactions might be utilized prior to a particular PIE becoming invalid. Upon activation, for example, the account-holder might choose how many transactions may be performed prior to a particular PIE becoming invalid.

It should be appreciated that rather than the number of transactions determining when a particular PIE becomes invalid, other operating parameters may alternatively be utilized. For example, at the end of every month, or at some other predetermined time in each month or year, an account-holder might be required to renew her PIE.

It should be appreciated that in accordance with some embodiments of the method of the invention, a personal digital assistant (PDA) might be utilized. Illustratively, a customer wishing to check out of a store with her purchases may initially enter the alias into her PDA. In turn, the PDA communicates the alias information to the processing system of the cashier. This communication may be performed utilizing suitable communication technology, such as infrared technology. Upon receiving the alias, the cashier's processing system then prompts the customer for the customer's PIE. This prompting may be performed in any suitable manner. The customer may then enter the PIE into her PDA, which is then communicated to the cashier's processing system. It should be appreciated that such an arrangement may serve to limit the hardware requirements, for example, of the cashier by not requiring a keypad.

Once the alias and PIE are transferred to the cashier's processing system, authorization of the transaction is performed. Once the authorization is complete, the cashier's processing system may again communicate with the customer's PDA to transmit a digital receipt to the PDA. Accordingly, a paperless transaction is effected. It should be appreciated that in the context of this example, a PDA is utilized. However, this embodiment of the method of the invention might utilize any handheld computer or other processing system, which is capable of the processing as described above. That is, handheld computers or other processing systems, which are not characterized as "personal digital assistants" might also be utilized in conjunction with this embodiment of the invention.

As described above, a telephone number might be conveniently used as a PIE or as the alias. However, one possible shortcoming of utilizing a telephone number is that the telephone number is easily obtained by other persons. As a result, it may be preferable to use alternatives to a person's telephone number including numbers, alphabetical letters, alphanumerics, phrases, or combinations of such items as may be desired. In accordance with further embodiments of the system and method of the invention, various other operating parameters might be utilized as the alias and/or the PIE. For example, when performing an on-line transaction, the user identification parameters of an account-holder's computer, which may be obtained by the credit card company upon login may be used. Accordingly, an account-holder's user log-on information, for example, may be utilized in a manner similar to use of an automatic number identification (ANI) system, as described above. Further, such user identification based on the user identification parameters of an account-holder's computer may be utilized as a level of security in addition, rather than in substitution, of an alias and/or a PIE.

In accordance with further embodiments of the method of the invention, the alias and/or the PIE may include both static portions as well as dynamic portions, i.e., changing portions. Illustratively, the first ten digits of an account-holder's alias may be the account-holder's telephone number. However, the last two digits change. The change of the last two digits adds a further level of security. It should be appreciated, this further level of security may also add complexity to the transaction, which may not be desired or necessary.

In further explanation of the dynamic portion, the dynamic portion may be dependent upon the time of day, the month, or the geographic area in which the customer is effecting the purchase, for example. If dependent upon the time of day, the customer might enter her phone number as the first ten digits of the alias and "02" as the last two digits of the alias, assuming that the time is in the 2 o'clock hour, i.e., 2:45 p.m., for example. It should of course be appreciated that the dynamic portion of the alias and/or the PIE may be dependent upon a wide variety of parameters as is necessary or desired.

In accordance with a further embodiment of the method of the invention, an account-holder may routinely use a particular alias and PIE, but in addition possess specialty PIEs. In accordance with this embodiment, the specialty PIEs are entered in lieu of the routine PIE to effect certain predetermined options. For example, a specialty PIE might be utilized to deactivate the account-holder's debit card permanently, or alternatively, for a predetermined time. This might be particularly useful in the situation where one misplaces her debit card but then finds the debit card two days later. Other specialty PIEs might be utilized to provide a variety of options. For example, a specialty PIE might be utilized to adjust the available balance on the credit card utilized by a teenager under a parent's supervision. Thus, using a suitable account-holder interface, the account-holder would enter the alias and specialty PIE number. Thereafter, the user interface would prompt the parent account-holder to enter the desired credit limit.

In accordance with some of the exemplary embodiments described above, processing to effect authorization was performed upon the entry of the alias and PIE. However, it should be appreciated that the method of the invention is not limited to such immediate processing. That is, a merchant operating in the setting of a fair, for example, may not have capabilities to communicate with a particular account-holder's banking institution. As a result, the merchant may accept the alias and PIE from a customer and perform the processing of the alias and PIE at some later time, i.e., at the end of the day. Such business operation is of course dependent upon the merchant's risk assessment, i.e., weighing the desire to make the sale against the possibility of a fraudulent purchase.

Hereinafter, further considerations relating to use of multiple PIEs will be described. As described above, an account-holder may rotate through different PIEs for added security. Also, the account-holder may be prompted for a particular PIE, i.e., depending on where that account-holder is in the rotation of the PIEs. However, it should be appreciated that considerations must be taken into account when utilizing multiple PIEs in conjunction with batch techniques of processing. For example, the above described merchant operating in the setting of a fair may well utilize batch type processing at the end of the day to submit acquired alias and PIE numbers. Also, merchants in other situations may well utilize batch techniques. Thus, an "out of sequence" situation may arise from such batch processing. For example, the account-holder may have provided their alias and appropriate PIE number, based on the rotation status, but that PIE has not yet been processed. As a result, if the account-holder attempts a second transaction of the day, the account-holder may be prompted yet again for the same PIE. This can cause problems with verification and authorization of such an out of sequence transaction.

In accordance with one embodiment of the method of the invention, the above out of sequence problem is addressed by accepting any PIE number coming from certain vendors on a particular day. That is, the generally required order sequence of the PIE will be disregarded.

Alternatively, the verification and authorization of the transaction may consider both the PIE number, as well as the time of the transaction. That is, each transaction is time-stamped. Thus, the time of each sequential transaction would progress in a manner corresponding with the particular PIE utilized.

Further, a set of rules may be established to address specific situations. For example, a rule might indicate that if an alias and PIE are submitted utilizing batch processing techniques and no time of the transaction is provided, then that transaction will be authorized so long as the alias and PIE successfully fill a "slot" of the day. To explain, assume that PIE number 1 was used at one o'clock, PIE number 3 was used at three o'clock, and PIE number 1 was again used at five o'clock. Also assume that an untimed transaction was also submitted in that same day, and that the untimed transaction was done using the number 2 PIE. Then, in this case, the activities of the day match with the untimed PIE.

As described above and in accordance with one embodiment of the method of the invention, it should be appreciated that an account-holder may utilize the PIE and alias of the invention in a first transaction of the day and later perform a transaction using the same card in the conventional manner, i.e., utilizing the magnetic strip of the card followed by the common signature. As should be appreciated, use of the alias and PIE may be highly desirable in some transactions. As a result, the issuing bank of the card may impose a fee for this added convenience. The fee may be triggered by any suitable processing step such as authorization of an alias and PIE. Further, suitable fees may be imposed based on various other parameters as is necessary or desired.

Figure 5:
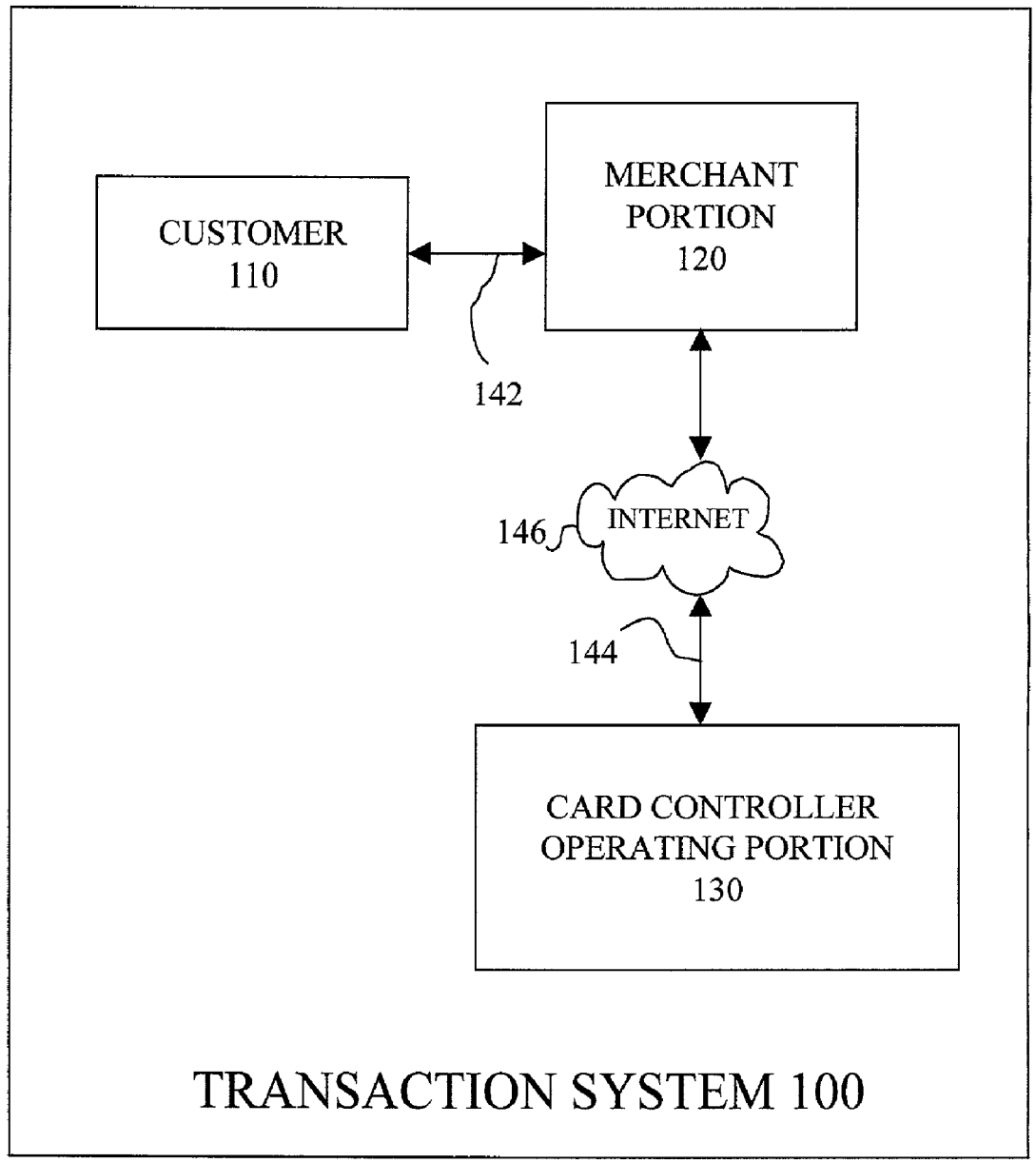
FIG. 5 is a block diagram showing a transaction system according to one embodiment of the present invention.

In further explanation of the system and method of the invention, FIG. 5 illustrates an exemplary transaction system 100, which utilizes the method of the invention. As shown in FIG. 5, the transaction system 100 includes a customer 110, a merchant portion 120 and a card controller operating portion 130.

The customer 110, the merchant portion 120 and the card controller operating portion 130 perform a variety of activities utilizing the processes of the invention described above. That is, the customer 110 interacts with the merchant portion 120 utilizing a communication interface 142. The communication interface 142 may be in the form of a network or over the Internet, for example. Alternatively, it should be appreciated, the communication interface 142 may simply be in the form of verbal communication between the customer 110 and the merchant portion 120.

The customer 110 and the merchant portion 120 interact utilizing the processes of the invention as described above. Accordingly, during the course of a transaction, the customer 110 provides both an alias and PIE to the merchant portion 120. In response, and at predetermined times during the transaction, the merchant portion 120 may communicate with the card controller operating portion 130. The communication between the merchant portion 120 and the card controller operating portion 130 may utilize a suitable communication interface 144 such as a network or the Internet 146, as shown in FIG. 5. The merchant portion 120 may also be characterized as an "interface portion" in that it interfaces with the customer.

Figure 6:
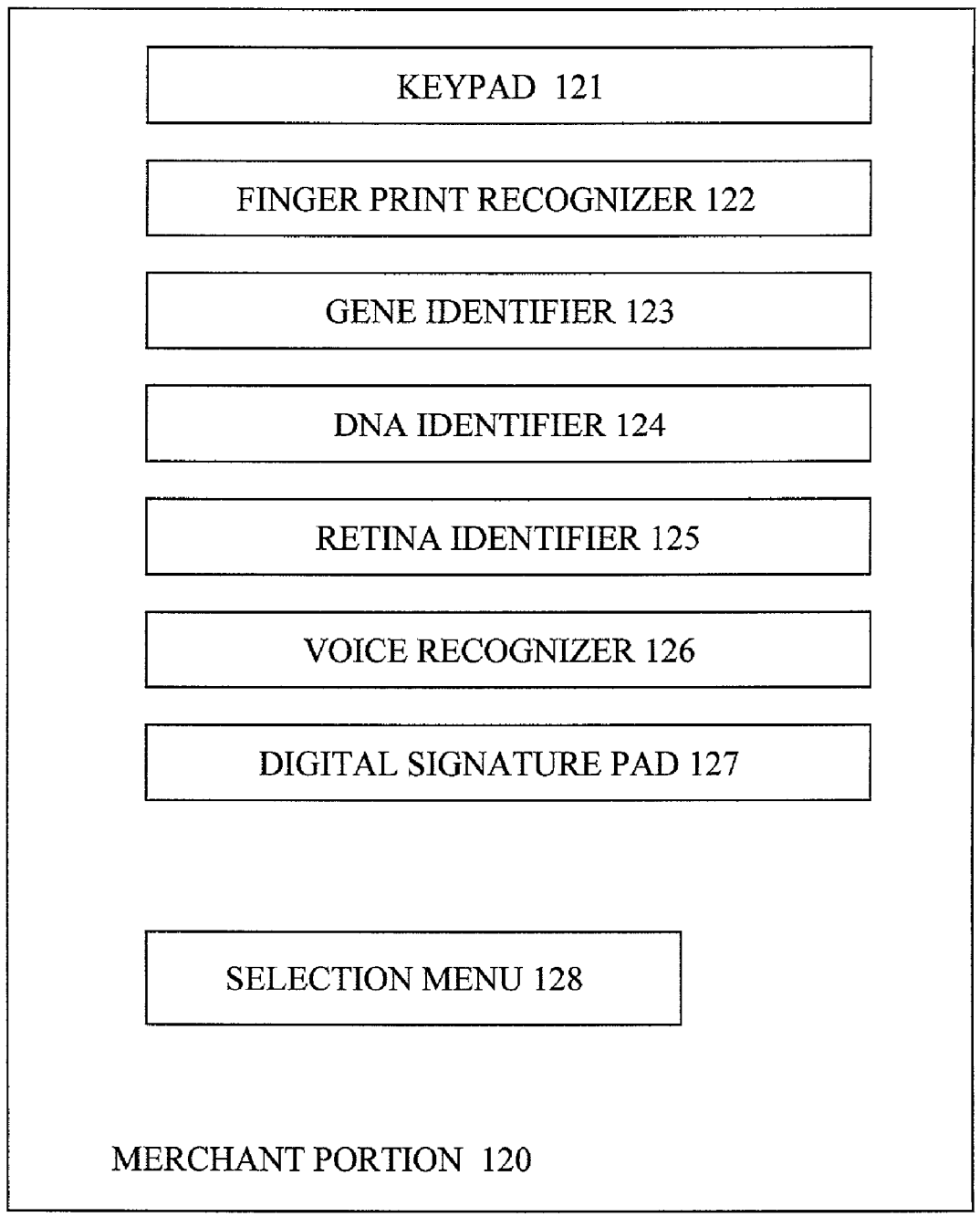
FIG. 6 is a block diagram showing the merchant portion of FIG. 5 in further detail according to one embodiment of the present invention.

FIG. 6 is a block diagram showing further details of the merchant portion in accordance with embodiments of the methods and systems of the invention. Specifically, FIG. 6 shows the various components a merchant may utilize by which an account-holder may enter an alias or a PIE. That is, the merchant portion 120 of FIG. 6 includes a keypad 121, a finger print recognizer 122, a gene identifier 123, a DNA identifier 124, a retina identifier 125 and a voice recognizer 126. The merchant portion 120 may use one of such components or more than one, as is desired, to identify either the alias or the personal identification entry (PIE).

The merchant portion 120 may also include a digital signature pad, by which a customer's signature may be digitally obtained, as is described above. The merchant portion 120 may also include a selection menu 128. The selection menu 128 allows a user to enter various selections, as described above, such as which payment method might be utilized, for example.

Figure 7:
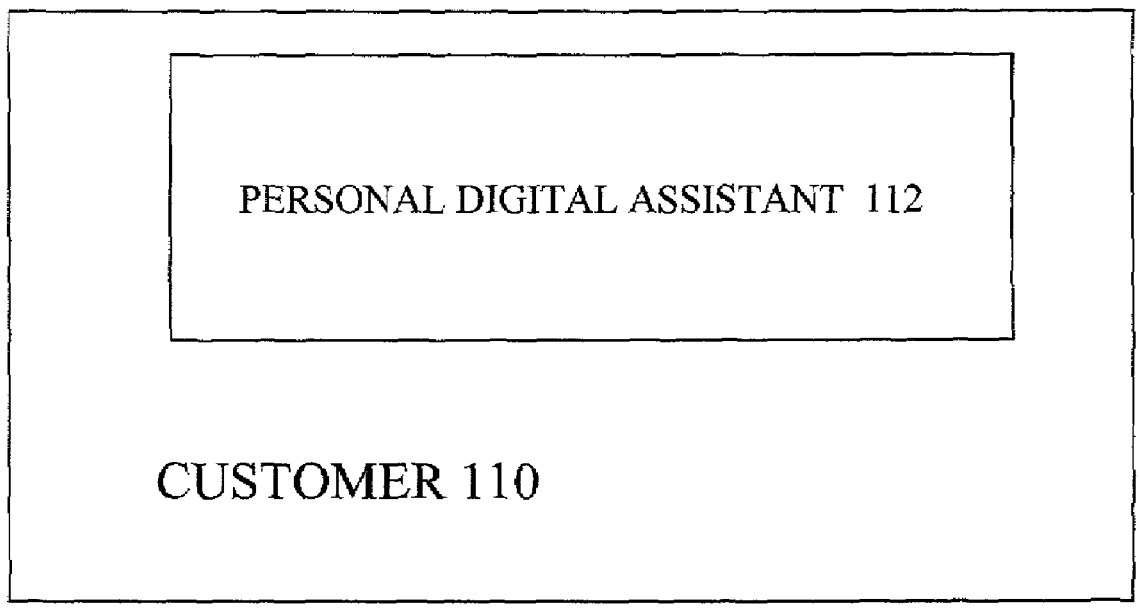
FIG. 7 is a block diagram showing the customer portion of FIG. 5 in further detail according to one embodiment of the present invention.

Further, FIG. 7 is a block diagram showing further details of the customer 110 in accordance with one embodiment of the methods and systems of the invention. Specifically, the customer 110 may include a personal digital assistant (PDA) 112. The PDA may be utilized in conjunction with a cashier, for example, as described above.

As described above, the invention is discussed in the context of a purchasing individual interacting with a business entity. However, the method of the invention is not limited to such interaction. Specifically, the alias and PIE technique of the invention may also be utilized in conjunction with other transactions, such as business to business interactions, for example.

In accordance with further aspects of the invention, the methods of using an alias and PIE of the invention may also be applied to a situation where two or more approvals need to be provided prior to granting a transaction. This might apply to a transaction of a more substantial nature, for example. For instance, a major purchase by a company might require two approvals, or alternatively, a parent approving a major purchase of a teenager, for example. In these situations, multiple approvals are needed to execute the transaction. In other words, the account-holder may be thought of as being two persons.

In accordance with one embodiment of the invention, such multiple approvals may utilize what might be characterized as a "partial PIEs," or alternatively, the multiple approvals might be characterized as "double PIEs." To explain, the partial PIEs are submitted together, but probably at different times, so as to form a complete PIE. The partial PIEs include a first partial PIE and a second partial PIE, for example. The first partial PIE may be received and stored. Thereafter, in order to effect the transaction, the second partial PIE is required. Alternatively, the second partial PIE might be received first and then the first partial PIE, i.e., the order of the receipt of the first and second partial PIEs does not matter.

However, in accordance with one embodiment of the invention, there is a time limit placed on how much time can pass between receipt of the two partial PIEs. For example, when a first person submits her partial PIE, i.e., the first of two needed partial PIEs, she can specify the time limit or expiration period. To explain further, the elapsed time period between accepting entry of the first partial PIE and accepting entry of the second partial PIE is determined. If the elapsed time period is greater than a predetermined time period, for example the time period set by the first person, then the second partial personal identification entry is nulled, i.e., is made invalid. As a result, the transaction will not be authenticated nor performed.

Illustratively, college tuition is due for $5000. A father tells his son that he will pay for the tuition. The father calls in the alias, for the account from which the finds will be taken, and the father's partial PIE. The father provides an expiration date of five days. Subsequently, the son goes through the college finance department and sets up his courses. The son determines that the courses cost $4200 and, after four days, submits this amount using the alias of his father, or some other password, as well as the son's partial PIE. The transaction has both partial PIEs and is authorized accordingly.

In accordance with embodiments of the method of the invention as described above, a customer or business entity, for example, utilizes an alias and PIE to perform a transaction. The processing of the transactions as described above commonly may include transmission of data, including confidential information, over the Internet or other network. It should be appreciated that known techniques may be utilized in conjunction with the method of the invention. For example, conventional encryption techniques may be utilized to protect the confidentiality of data during transmission.

Figure 8:
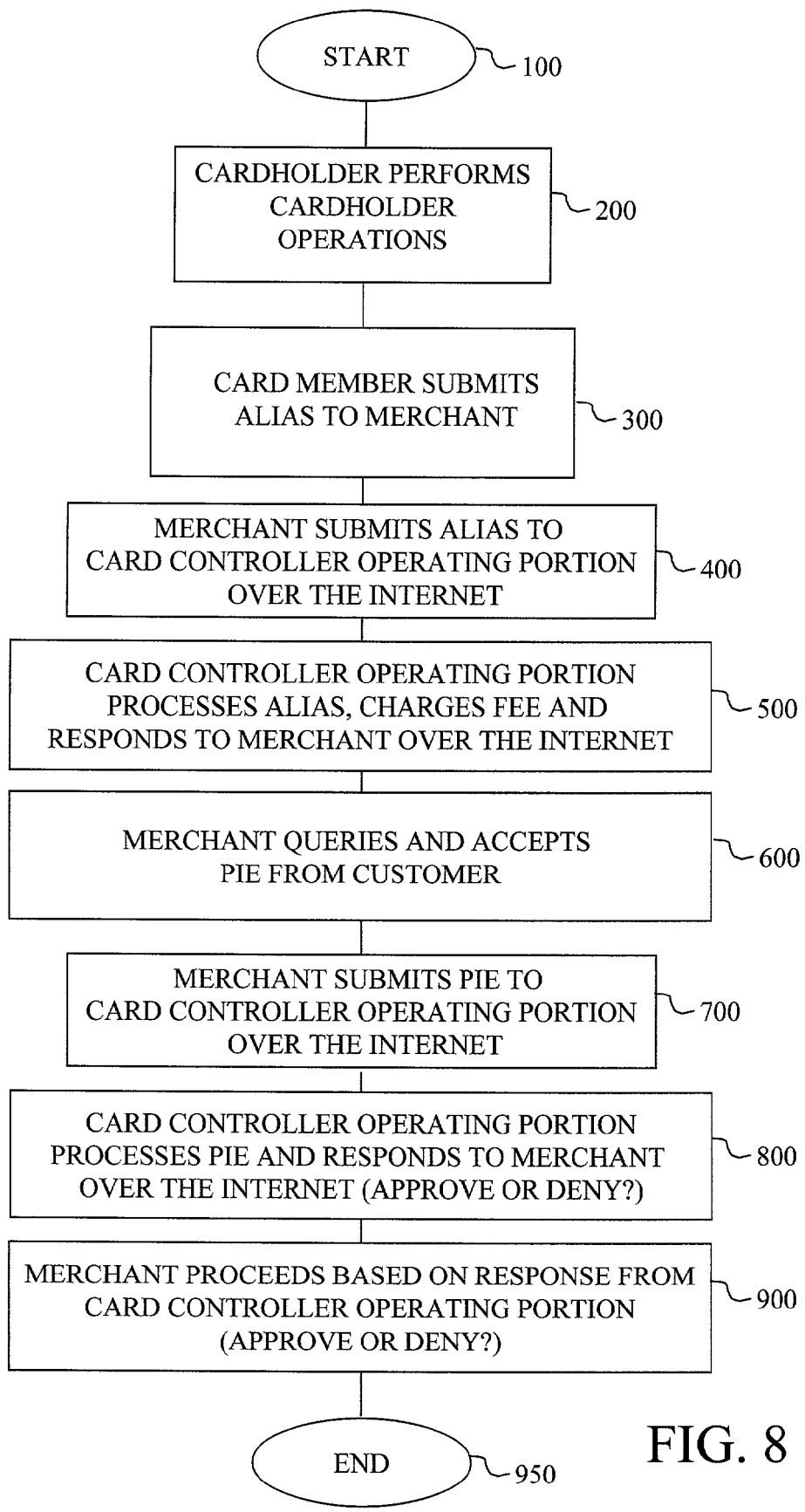
FIG. 8 is a flow chart showing a method of use according to a further embodiment of the invention.

FIG. 8 is a flowchart showing further aspects of the invention in accordance with one embodiment of the methods of the invention. It should be appreciated that the process of FIG. 8, as well as FIGS. 9–11 may be performed using the system of FIGS. 5–7, or another suitable system.

As shown in FIG. 8, the process starts with step 100. Then, the process passes to step 200. In step 200 the account-holder performs account-holder operations, which are described in further detail below. Then, in step 300, the card member submits an alias to a merchant. In step 400 the merchant submits the alias to a card controller operating portion over the Internet, or some other communications network, for example. After step 400, the process passes to step 500.

In step 500, the card controller operating portion processes the alias, charges a fee and responds to the merchant over the Internet. Then, in step 600 the merchant queries and accepts a PIE from the customer. After step 600, the process passes to step 700. In step 700, the merchant submits the PIE to the card controller operating portion over the Internet, private network, or wireless network, for example. In step 800 the card controller operating portion processes the PIE and responds to the merchant over the Internet, private network or wireless network, i.e., the merchant approves or denies the request. Then, in step 900, the merchant proceeds based on the response from the card controller operating portion. After step 900, the process passes to step 950. In step 950, the process ends.

Figure 9:
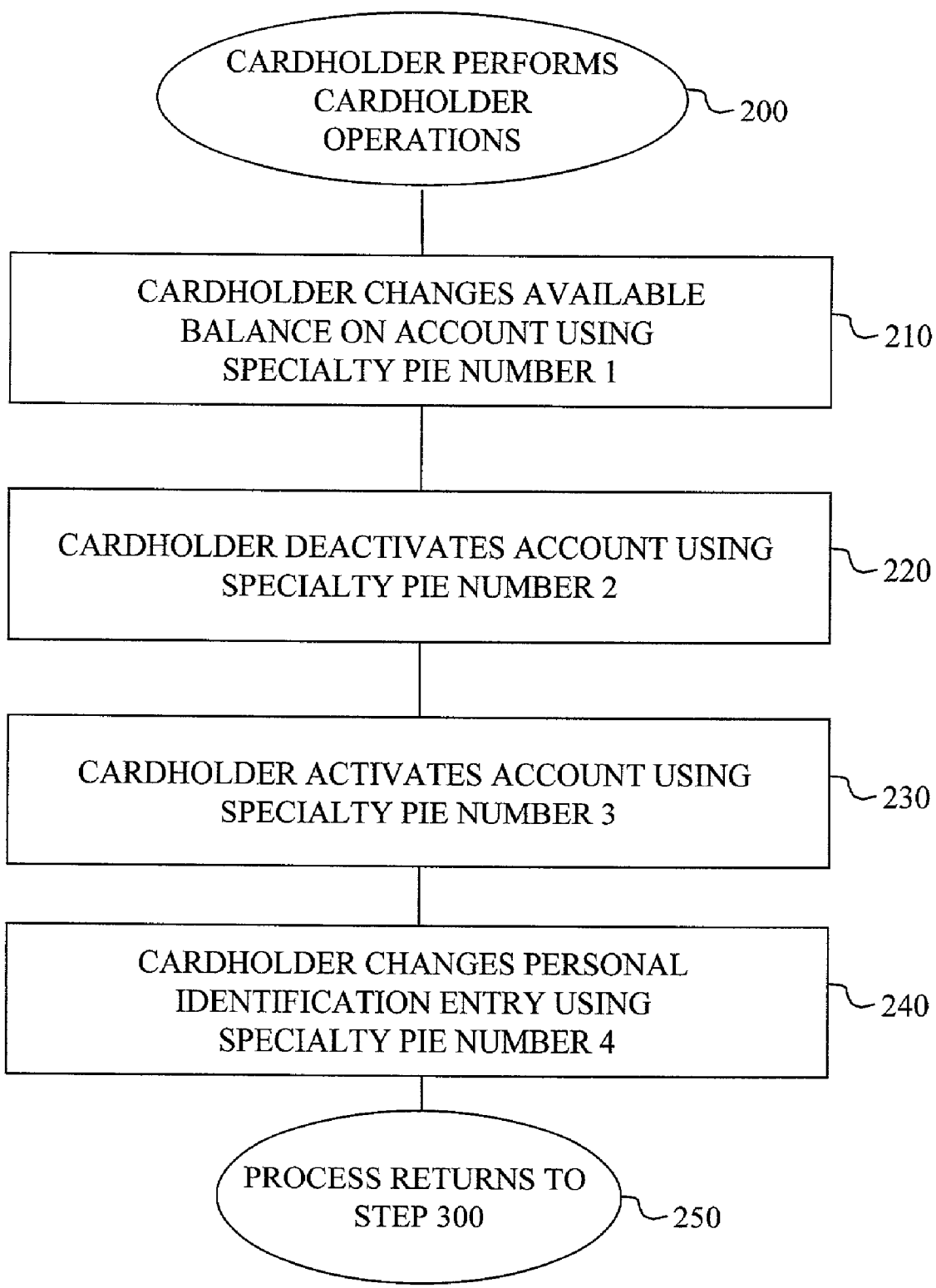
FIG. 9 is a flow chart showing the account-holder performs account-holder operations step of FIG. 8 in further detail according to one embodiment of the invention.

Hereinafter, further aspects of the "account-holder performs account-holder operations" step 200 of FIG. 8 will be described in further detail with reference to FIG. 9. Specifically, FIG. 9 shows further aspects of use of a specialty PIE. As shown in FIG. 9, this sub-process starts in step 200. Then, the process passes to step 210. In step 210 the account-holder changes the available balance on an account using specialty PIE number 1. After step 210, the process passes to step 220.

In step 220 the account-holder deactivates an account using specialty PIE number 2. Further, in step 230 account-holder activates an account using specialty PIE number 3. It should be appreciated that such deactivation and activation may be performed on different accounts or may be performed at different times, for example.

After step 230, the process passes to step 240. In step 240 the account-holder changes his or her personal identification entry (PIE) using specialty PIE number 4. Then, in step 250 the process returns to step 300.

Figure 10:
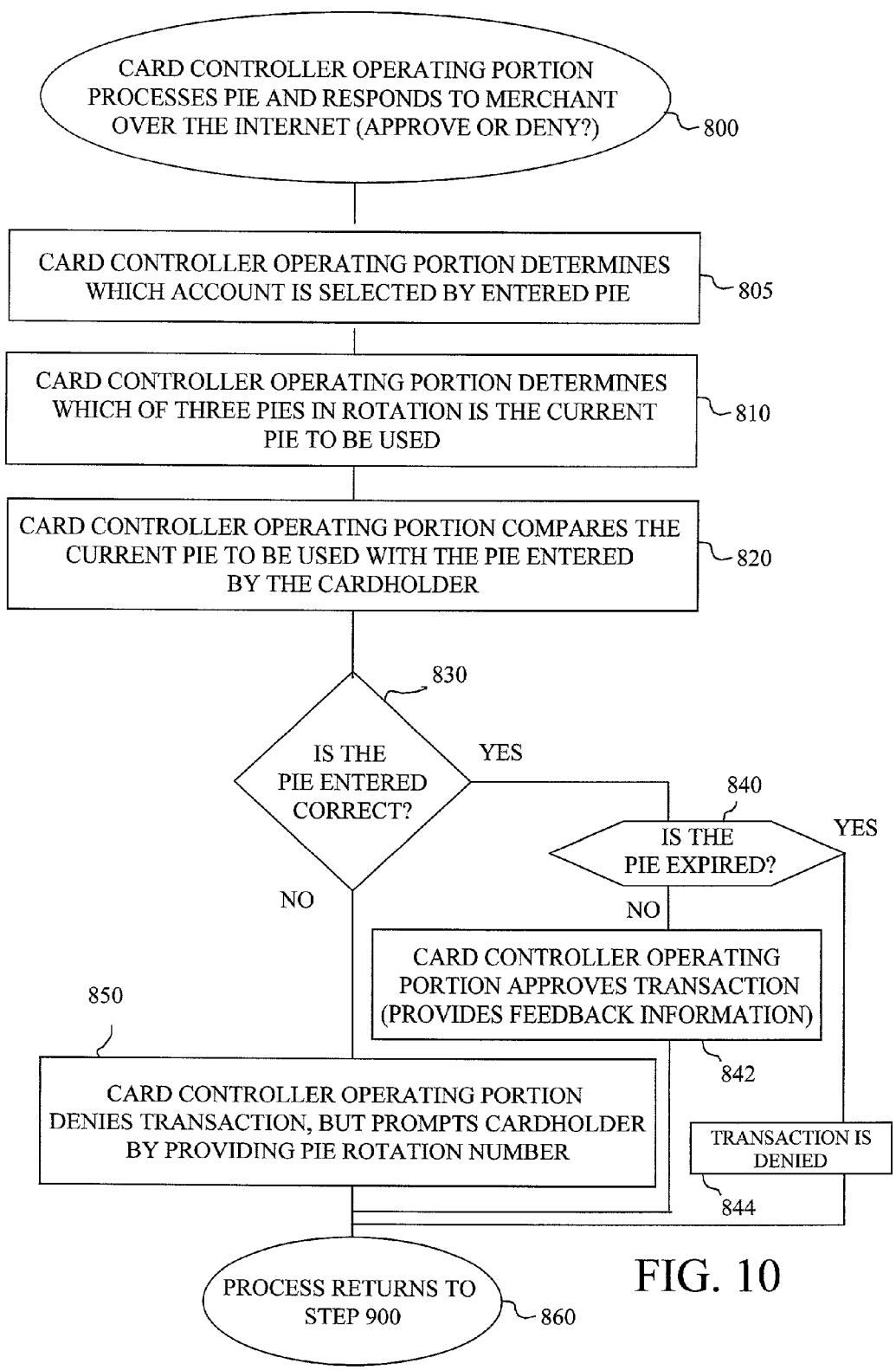
FIG. 10 is a flow chart showing the card controller operating portion processes PIE and responds to merchant over the Internet step of FIG. 8 in further detail according to one embodiment of the invention.

FIG. 10 is a flowchart showing in further detail the "card controller operating portion processes PIE and responds to merchant over the Internet" step 800 of FIG. 8 in accordance with one embodiment of the methods and systems of the invention. As shown in FIG. 10, the process starts in step 800. Then, in step 805 the card controller operating portion determines which account is selected by the entered PIE.

That is, it should be appreciated that the account-holder may have multiple accounts which may be selected. Then, the process passes to step 810.

In step 810 the card controller operating portion determines which of three PIEs in rotation is the current PIE to be used. That is, the account-holder is using a security measure in which the account-holder rotates through three different PIEs. Then, the process passes to step 820. In step 820 the card controller operating portion compares the current PIE to be used with the PIE entered by the account-holder. Then, in step 830 the process determines "is the PIE entered correct?" If the answer is "yes," i.e., the entered PIE is correct, then the process passes to step 840.

In step 840 the process determines whether the PIE has expired?, i.e., whether the PIE has been used too many times before renewing the PIE. If the subsequent determination is "No," in step 840, then the processes passes to step 842.

In step 842, the card controller operating portion approves the transaction, and may provide feedback information. Such feedback information may then be conveyed on to the customer, i.e., such as by printing on the customer's receipt. After step 842, the process passes to step 860.

Alternatively, the process may determine that the PIE has expired in step 840.

Then, the process passes to step 844. In step 844 the transaction is denied. After step 844, the process passes to step 860.

In step 830, if the entered PIE is determined to be incorrect, then the process passes to step 850, rather than step 840 as described above. In step 850, the card controller operating portion denies the transaction, but prompts the account-holder by providing the PIE rotation number. That is, for example, the card controller operating portion provides helpful feedback information to the account-holder which may assist the account-holder. After step 850, the process passes to step 860. In step 860, the process returns to step 900.

Figure 11:
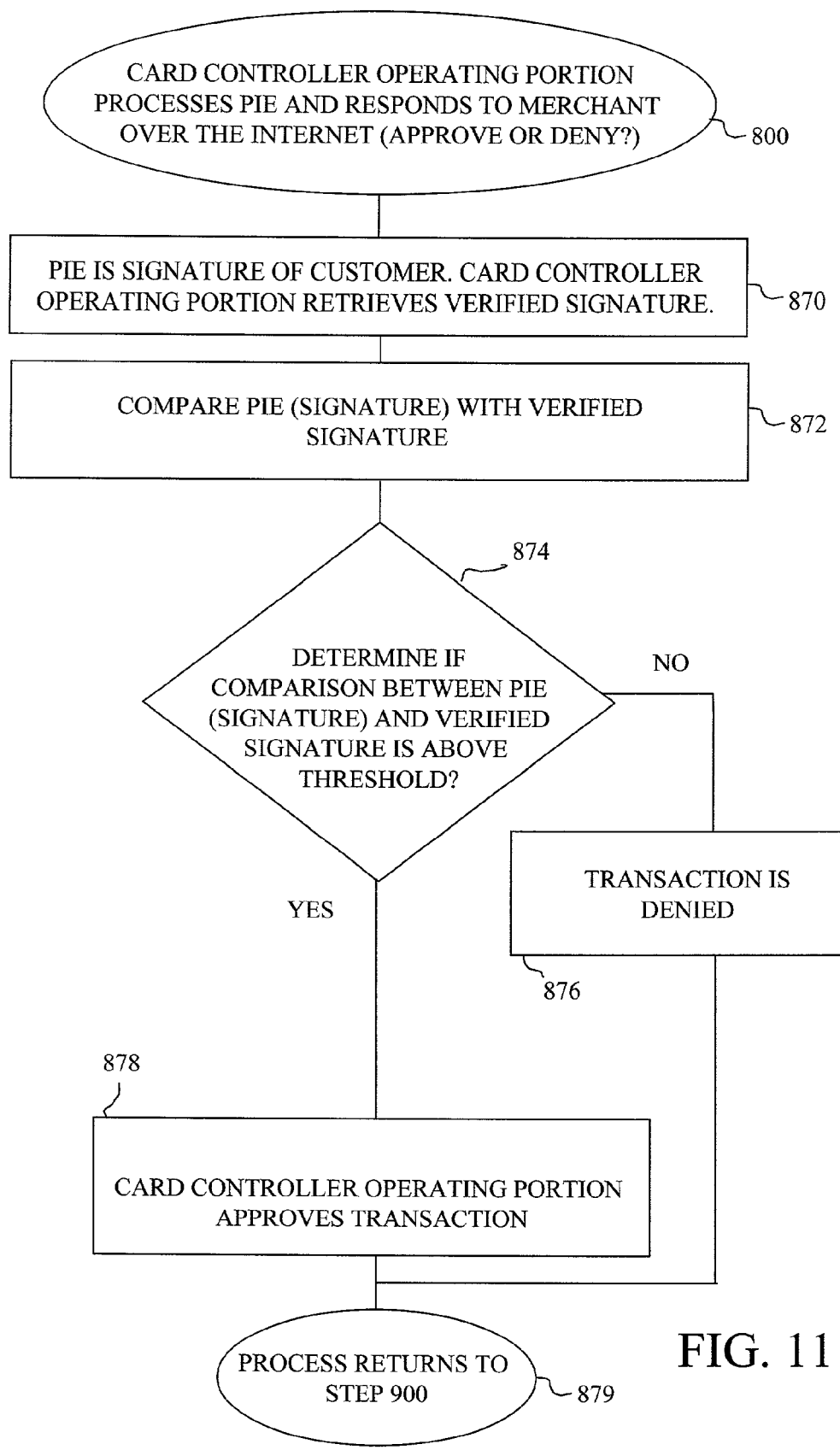
FIG. 11 is a flow chart showing the card controller operating portion processes PIE and responds to merchant over the Internet step of FIG. 8 in further detail according to a further embodiment of the invention.

FIG. 11 is a flowchart showing the "card controller operating portion processes PIE and responds to merchant over the Internet" step 800 of FIG. 8 in accordance with a further embodiment of the methods and systems of the invention. As shown in FIG. 10, the process starts in step 800. After step 800, as shown in FIG. 11, the process passes to step 870. In step 870 the process recognizes that the PIE is actually the signature of a customer. As a result, the card controller operating portion retrieves a verified signature from a database, for example. Then, the process passes to step 872.

In step 872, the PIE, i.e., the signature of the customer, is compared with the retrieved verified signature. Then, in step 874, a determination is made as to whether a comparison between the PIE signature and verified signature is above a threshold. For example, the pixel data representing both the verified signature and the submitted signature may be compared. If the comparison is not above the threshold, then the process passes to step 876. In step 876, the transaction is denied. After step 876, the process passes to step 879.

Alternatively, if above the threshold in step 874, then the process passes to step 878. In step 878 the card controller operating portion approves the transaction requested. After step 874, the process passes to step 879. In step 879, the process returns to step 900.

It should be appreciated that various features in accordance with embodiments of the methods and systems of the invention are described in conjunction with use of an alias and use of a PIE, respectively. However, it should further be appreciated that those features relating to an alias, as described above, may also be applied to a PIE. Further, those features relating to a PIE, as described above, may also be applied to an alias. For example, in accordance with embodiments of the methods and systems of the invention, the user may select an alias in the same manner as selection of a PIE, and vice-a-versa.

As described above, embodiments of the system of the invention as shown above may be in the form of a computer or computer system. As used herein, the term "computer" or "computer system" is to be understood to include at least one processor utilizing a memory or memories. The memory stores of the system of the invention retain at least portions of an executable program code at one time or another during operation of the processor portion of the computer. Additionally, the processor executes various instructions included in that executable program code. An executable program code means a program in machine language that is able to run in a particular computer system in an environment to perform a particular task. The executable program code processes data in response to commands by a user. As used herein, it will be appreciated that the term "executable program code" and the term "software" mean substantially the same thing for the purposes of the description as used herein.

It is to be appreciated that to practice the system and method of the invention, it is not necessary that various processors and/or the memories used in the practice of the invention be physically located in the same place. That is, it should be appreciated that each of the processors and the memories may be located in geographically distinct locations and connected so as to communicate in any suitable manner, such as over a suitable network or the Internet, for example. Additionally, it should be appreciated that each of the processors and/or the memories may be composed of the same or different physical pieces of equipment. Accordingly, it is not necessary that the processor be one single piece of equipment in one location and that the memory be another single piece of equipment in another location. That is, it is contemplated that the particular processor may be two pieces of equipment in two different physical locations. The two distinct pieces of equipment may be connected in any suitable manner. Additionally, a particular memory used in the invention may include two or more portions of memory in two or more physical locations. Further, the memory could include or utilize memory stores from the Internet, Intranet, Extranet, LAN, satellite interface or some other source or over some other network, as may be necessary or desired.

As described above, the method of the invention may illustratively be embodied in the form of a computer or computer operating system. It is to be appreciated that the software or programs that enable the computer operating system to perform the operations described above may be supplied on any of a wide variety of media to hold data. Further, it should be appreciated that the implementation and operation of the system and method of the invention may be in the form of computer code written in any suitable programming language or languages, which provide instructions to the computer by which the computer may manipulate data.

It should be appreciated that the software code or programming language that is utilized in a computer system to perform the above described invention may be provided in any of a wide variety of forms. Illustratively, the software may be provided in the form of machine language, assembly code, target language, object code, source code or source language, as well as in other forms. Further, the software may be in the form of compressed or encrypted data utilizing a suitable compression or encryption algorithm.

Additionally, it should be appreciated that the particular medium utilized to hold either the software used in conjunction with the invention or the data, which is manipulated by the software, may take on any of a variety of physical forms. Illustratively, the medium may be in the form of a compact disk, a DVD, an integrated circuit, a hard disk, a floppy diskette, a magnetic tape, a RAM, a ROM, or a remote transmission, as well as any other medium or source of information that may be read by a computer or other operating system.

Accordingly, the software of the method of the invention may be provided in the form of a hard disk or be transmitted in some form using a direct telephone connection, the Internet, an Intranet, or a satellite transmission, for example. Further, the programming language enabling the system and method of the invention as described above may be utilized on all of the foregoing and any other medium by which software or executable program code may be communicated to and utilized by a computer or other operating system.

As described herein, the system and method of the invention may utilize an application program, a collection of separate application programs, a module or modules of a program, or a portion of a module of a program, for example. As noted above, it should be appreciated that the computer language used in the system and method of the invention may be any of a wide variety of programming languages. Further, as is also noted above, it is not necessary that a single programming language be utilized in conjunction with the operation of the system and method of the invention. Rather, any number of different programming languages may be utilized as is necessary or desirable.

As described above, in the system and method of the invention, a variety of user interfaces may be utilized such as by a customer, for example. A user interface may be in the form of a key pad, for example. As used herein, a user interface includes any software, hardware or combination of hardware and software used in an operating system that allows a user, or other person, to interact with the operating system. A user interface may also include any of a touch screen, keyboard, mouse, voice recognition device, dialogue screen, menu box, a list, a checkbox, a toggle switch, a pushbutton or any other object that allows a user to receive information regarding the operation of the program and/or provide the operating system with information. Accordingly, a user interface used in conjunction with the system and method of the invention may be any device or collection of devices that provides communication between a user, i.e., an account-holder for example, and a computer. The information provided by the user to the computer through the user interface may be in the form of a command, a selection of data, or other input, for example.

While the foregoing description includes many details and specifications, it is to be understood that these have been included for purposes of explanation only, and are not to be interpreted as limitations of the present invention. Many modifications to the embodiments described above can be made without departing from the spirit and scope of the invention, as is intended to be encompassed by the claims and their legal equivalents.

What is claimed is:

1. A system for completing a transaction relating to an account in the system wherein an account-holder is not required to know an account number and is not required to have an account card physically present during the transaction, the system comprising:

an account controller operating processor portion including a database, the account controller operating processor portion linking a selected alias of the account-holder with the account number of the account and a selected personal identification entry, which is associated with the account number, in the database, wherein each of the selected alias and the selected personal identification entry is previously selected by the account-holder;

an interface processor portion in communication with the account controller operating processor portion, the interfaces processor portion effecting a transaction for the account-holder by receiving from the account-holder the selected alias and an entered personal identification entry into the interface processor portion, the interfaces processor portion communicating the selected alias and entered personal identification entry to the account controller operating processor portion;

wherein the account controller operating processor portion searches the database for the selected alias and the selected personal identification entry that is linked to the selected alias, the account controller operating processor portion authenticating the transaction and communicating such authentication to the interfaces processor portion if the entered personal identification entry entered by the account-holder matches the selected personal identification entry found through the database search; and the interface processor portion completing the transaction for the account number if the transaction is authenticated; and wherein one of the selected alias and the selected personal identification entry includes both:
      a static portion, the static portion being a designated portion of the selected alias or the selected personal identification entry that is not changed; and
      a dynamic portion, the dynamic portion being a designated portion of the selected alias or the selected personal identification entry that is changed while the static portion is not changed.

2. The system of claim 1, wherein the account number is a credit card number, and the interface processor portion completing the transaction if the transaction is authenticated includes charging the credit card number.

3. The system of claim 1, wherein the transaction is completed over the Internet.

4. The system of claim 3, wherein the interface processor portion is a merchant.

5. The system of claim 1, wherein the account is selected from the group consisting of a credit card account, a mutual funds account, a money market account, a margin account, a bank account, a line of credit account, a sweeps card account, a stock account, and an information account.

6. The system of claim 1, wherein the interface processor portion is an automated teller machine.

7. The system of claim 1, wherein the selected personal identification entry is a personal identification number (PIN).

8. The system of claim 1, wherein the selected alias includes at least one of numbers, alphanumerics, names, phrases, fingerprint recognition, gene identification, DNA identification, biometrics, retina identification, and voice recognition.

9. The system of claim 1, wherein the selected personal identification entry includes at least one of numbers, alphanumerics, names, phrases, fingerprint recognition, gene identification, DNA identification, biometrics, retina identification, and voice recognition.

10. The system of claim 1, further including the account controller operating processor portion charging a fee in connection with performing the transaction for the account number if the transaction is authenticated.

11. The system of claim 1, wherein the interface processor portion is a merchant portion, and the merchant portion prompting the account-holder for entry of a further selection subsequent to the account-holder entering the selected alias and entered personal identification entry; and wherein the merchant portion completing the transaction based on the further selection.

12. The system of claim 11, wherein the merchant portion prompts the account-holder for entry of a further selection using a selection menu, and wherein the further selection determines which one of a plurality of possible payment methods is used.

13. The system of claim 12, wherein the plurality of possible payment methods includes a credit payment method and a debit payment method.

14. The system of claim 1, wherein the account controller operating processor portion verifies the account-holder identification parameters of a computer of the account-holder, the computer used in the transaction.

15. The system of claim 1, wherein the interface processor portion includes a keypad, the selected alias and the entered personal identification entry are entered using the keypad.

16. The system of claim 1, wherein the account-holder is a first business entity and the account controller operating processor portion is a second business entity.

17. The system of claim 1, wherein the selected personal identification entry is an authorized signature, and the interface processor portion includes a digital signature pad, the account-holder signing a signed signature on a digital signature pad; and
wherein the account controller operating processor portion compares the authorized signature with the signed signature.

18. The system of claim 17, wherein the account controller operating processor portion compares the authorized signature with the signed signature by comparing data points of the authorized signature with data points of the signed signature to determined if a level of similarity is attained.

19. The system of claim 1, wherein the account-holder changes a personal identification entry of the account-holder, the changing the personal identification entry of the account-holder including changing the personal identification entry from a prior personal identification entry to the selected personal identification entry.

20. The system of claim 19, wherein the account-holder changes the personal identification entry of the account-holder using at least one selected from the group of an Internet transmission, a telephone communication, a person-to-person communication, a cellular phone system communication, a personal communications service communication and by mail.

21. The system of claim 1, wherein the system further includes a personal digital assistant, the account-holder entering the selected alias and the entered personal identification entry into the personal digital assistant, the personal digital assistant then communicating the selected alias and the entered personal identification entry to the interface processor portion for authenticating the transaction.

22. The system of claim 21, wherein the interface processor portion includes a processing system of a cashier.

23. The system of claim 22, wherein the processing system of the cashier electronically transmits digital receipt information to the personal digital assistant.

24. The system of claim 1, wherein the selected personal identification entry includes:
a static portion, the static portion being a portion of the selected personal identification entry that is not changed; and
a dynamic portion, the dynamic portion being a portion of the selected personal identification entry that is changed, the account-holder changing the dynamic portion of the selected personal identification entry while not changing the static portion of the selected personal identification entry using the interface processor portion.

25. The system of claim 1, wherein at least one of the selected alias and the entered personal identification entry is based on human characteristic recognition.

26. The system of claim 25, wherein the interface processor portion includes at least one of a fingerprint recognizer, gene identifier, DNA identifier, biometrics recognizer, retina identifier, and voice recognizer.

27. The system of claim 1, wherein the account-holder enters a specialty personal identification entry using the interface processor portion, the specialty personal identification entry effecting an operation on the account.

28. The system of claim 27, wherein the entry of the specialty personal identification entry performs an operation selected from the group deactivating the account and activating the account.

29. The system of claim 27, wherein the account is a funds account and the entry of the specialty personal identification entry adjusts the available balance of the funds account.

30. The system of claim 1, wherein:
the account is one of a plurality of possible accounts; and
the interface processor portion accepting entry of the entered personal identification entry from the account-holder includes accepting entry of one of a plurality of possible entered personal identification entries, the one of a plurality of possible entered personal identification entries determining which of the plurality of possible accounts is used in the transaction.

31. The system of claim 30, further including the interface processor portion providing the account-holder with feedback information regarding which of the plurality of possible accounts was used in the transaction.

32. A system for completing a transaction relating to an account in the system wherein an account-holder is not required to know an account number and is not required to have an account card physically present during the transaction, the system comprising:
a account controller operating processor portion including a database, the account controller operating processor portion linking a selected alias of the account-holder with the account number of the account and a selected personal identification entry, which is associated with the account number, in the database, wherein each of the selected alias and the selected personal identification entry is previously selected by the account-holder;
an interface processor portion in communication with the account controller operating processor portion, the interface processor portion effecting a transaction for the account-holder by receiving from the account-holder the selected alias and an entered personal identification entry into the interface processor portion, the interface processor portion communicating the selected alias and entered personal identification entry to the account controller operating processor portion;

wherein the account controller operating processor portion searches the database for the selected alias and the selected personal identification entry that is linked to the selected alias, the account controller operating processor portion authenticating the transaction and communicating such authentication to the interface processor portion if the entered personal identification entry entered by the account-holder matches the selected personal identification entry found through the database search; and the interface processor portion completing the transaction for the account number if the transaction is authenticated; and wherein the selected personal identification entry is one of a plurality of possible selected personal identification entries, the account controller operating processor portion determining the particular selected personal identification entry from the plurality of possible selected personal identification entries based on a rotation through the plurality of possible selected personal identification entries; and the entered personal identification entry is one of a plurality of possible entered personal identification entries, the account-holder determining the particular entered personal identification entries from the plurality of possible entered personal identification entries based on a rotation through the plurality of possible entered personal identification entries; and wherein the rotation, performed by the account controller operating processor portion, through the plurality of possible selected personal identification entries corresponds to the rotation, performed by the account holder interfacing with the interface processor portion, through the plurality of possible entered personal identification entries.

33. The system of claim 1, wherein the entered personal identification entry includes a first partial personal identification entry and a second partial personal identification entry; and the interface processor portion provided for accepting entry of the first partial personal identification entry by the first person; and the interface processor portion provided for accepting entry of the second partial personal identification entry by the second person; and wherein the first partial personal identification entry and a second partial personal identification entry collectively form the entered personal identification entry.

34. The system of claim 33, wherein the interface processor portion determines an elapsed time period between accepting entry of the first partial personal identification entry and accepting entry of the second partial personal identification entry; and the interface processor portion nulls the second partial personal identification entry if the elapsed time period exceeds a predetermined time period.

35. The system according to claim 34, wherein the interface processor portion provides for accepting entry of the predetermined time period from the first person.

36. The system of claim 1, wherein the account is a funds account, and wherein the account is one of a plurality of possible funds accounts; and the entered personal identification entry, entered into the interface processor portion and communicated to the account controller operating processor portion, is one of a plurality of possible entered personal identification entries; and p1 the account controller operating processor portion determines, based on the one of a plurality of possible entered personal identification entries, the hierarchical ranking of the order in which the plurality of possible funds accounts are accessed for withdrawal of funds.

37. The system of claim 1, wherein the account controller operating processor portion processes the selected alias of the account-holder prior to the account-holder submitting the selected personal identification entry.

38. A system for completing a transaction relating to an account in the system wherein an account-holder is not required to know an account number and is not required to have an account card physically present during the transaction, the system comprising:

an account controller operating processor portion including a database, the account controller operating processor portion linking a selected alias of the account-holder with the account number of the account and a selected personal identification entry, which is associated with the account number, in the database, wherein each of the selected alias and the selected personal identification entry is previously selected by the account-holder;

an interface processor portion in communication with the account controller operating processor portion, the interfaces processor portion effecting a transaction for the account-holder by receiving from the account-holder the selected alias and an entered personal identification entry into the interface processor portion, the interfaces processor portion communicating the selected alias and entered personal identification entry to the account controller operating processor portion;

wherein the account controller operating processor portion searches the database for the selected alias and the selected personal identification entry that is linked to the selected alias, the account controller operating processor portion authenticating the transaction and communicating such authentication to the interfaces processor portion if the entered personal identification entry entered by the account-holder matches the selected personal identification entry found through the database search; and the interface processor portion completing the transaction for the account number if the transaction is authenticated; and wherein the selected personal identification entry is one of a plurality of possible selected personal identification entries, the account controller operating processor portion determining a particular selected personal identification entry from the plurality of possible selected personal identification entries based on a rotation through the plurality of possible selected personal identification entries; and the entered personal identification entry is one of a plurality of possible entered personal identification entries, the account controller operating processor portion determining a particular entered personal identification entries from the plurality of possible entered personal identification entries based on a rotation through the plurality of possible entered personal identification entries; and wherein there are three possible selected personal identification entries that correspond to three possible entered personal identification entries.

39. A system for completing a transaction relating to an account in the system wherein an account-holder is not required to know an account number and is not required to have an account card physically present during the transaction, the system comprising:

an account controller operating processor portion including a database, the account controller operating processor portion linking a selected alias of the account-holder with the account number of the account and a selected personal identification entry, which is associated with the account number, in the database, wherein each of the selected alias and the selected personal identification entry is previously selected by the account-holder;

an interface processor portion in communication with the account controller operating processor portion, the interfaces processor portion effecting a transaction for the account-holder by receiving from the account-holder the selected alias and an entered personal identification entry into the interface processor portion, the interfaces processor portion communicating the selected alias and entered personal identification entry to the account controller operating processor portion;

wherein the account controller operating processor portion searches the database for the selected alias and the selected personal identification entry that is linked to the selected alias, the account controller operating processor portion authenticating the transaction and communicating such authentication to the interface processor portion if the entered personal identification entry entered by the account-holder matches the selected personal identification entry found through the database search; and the interface processor portion completing the transaction for the account number if the transaction is authenticated;

wherein the selected personal identification entry is one of a plurality of possible selected personal identification entries, the account controller operating processor portion determining a particular selected personal identification entry from the plurality of possible selected personal identification entries based on a rotation through the plurality of possible selected personal identification entries; and the entered personal identification entry is one of a plurality of possible entered personal identification entries, the account controller operating processor portion determining a particular entered personal identification entries from the plurality of possible entered personal identification entries based on a rotation through the plurality of possible entered personal identification entries;

wherein the account controller operating processor portion, through the interface processor portion, prompts the account-holder for the particular entered personal identification entry by providing a personal identification entry rotation number.

40. A system for completing a transaction relating to an account in the system wherein an account-holder is not required to know an account number and is not required to have an account card physically present during the transaction, the system comprising:

an account controller operating processor portion including a database, the account controller operating processor portion linking a selected alias of the account-holder with the account number of the account and a selected personal identification entry, which is associated with the account number, in the database, wherein each of the selected alias and the selected personal identification entry is previously selected by the account-holder;

an interface processor portion in communication with the account controller operating processor portion, the interfaces processor portion effecting a transaction for the account-holder by receiving from the account-holder the selected alias and an entered personal identification entry into the interface processor portion, the interface processor portion communicating the selected alias and entered personal identification entry to the account controller operating processor portion;

wherein the account controller operating processor portion searches the database for the selected alias and the selected personal identification entry that is linked to the selected alias, the account controller operating processor portion authenticating the transaction and communicating such authentication to the interfaces processor portion if the entered personal identification entry entered by the account-holder matches the selected personal identification entry found through the database search; and the interfaces processor portion completing the transaction for the account number if the transaction is authenticated;

wherein the account is a funds account, and wherein the account is one of a plurality of possible funds accounts; and the entered personal identification entry, entered into the interface processor portion and communicated to the account controller operating processor portion, is one of a plurality of possible entered personal identification entries; and the account controller operating processor portion determines, based on the one of a plurality of possible entered personal identification entries, the hierarchical ranking of the order in which the plurality of possible funds accounts are accessed for withdrawal of funds.

41. A system for completing a transaction relating to an account in the system wherein an account-holder is not required to know an account number and is not required to have an account card physically present during the transaction, the system comprising:

an account controller operating processor portion including a database, the account controller operating processor portion linking a selected alias of the account-holder with the account number of the account and a selected personal identification entry, which is associated with the account number, in the database, wherein each of the selected alias and the selected personal identification entry is previously selected by the account-holder;

an interface processor portion in communication with the account controller operating processor portion, the interfaces processor portion effecting a transaction for the account-holder by receiving from the account-holder the selected alias and an entered personal identification entry into the interface processor portion, the interface processor portion communicating the selected alias and entered personal identification entry to the account controller operating processor portion;

wherein the account controller operating processor portion searches the database for the selected alias and the selected personal identification entry that is linked to the selected alias, the account controller operating processor portion authenticating the transaction and communicating such authentication to the interface processor portion if the entered personal identification entry entered by the account-holder matches the selected personal identification entry found through the database search; and the interface processor portion completing the transaction for the account number if the transaction is authenticated; and wherein the account controller operating processor portion processes the selected alias of the account-holder prior to the account-holder submitting the selected personal identification entry.

* * * * *